United States Patent
Aditham et al.

(10) Patent No.: US 10,805,316 B2
(45) Date of Patent: Oct. 13, 2020

(54) SYSTEMS AND METHODS FOR DETECTING ATTACKS IN BIG DATA SYSTEMS

(71) Applicant: University of South Florida, Tampa, GA (US)

(72) Inventors: Santosh Kumar Aditham, Tampa, FL (US); Nagarajan Ranganathan, Tampa, FL (US)

(73) Assignee: UNIVERSITY OF SOUTH FLORIDA, Tampa, FL (US)

(*) Notice: Subject to any disclaimer, the term of this patent is extended or adjusted under 35 U.S.C. 154(b) by 0 days.

(21) Appl. No.: 15/569,465

(22) PCT Filed: May 22, 2017

(86) PCT No.: PCT/US2017/033769
§ 371 (c)(1),
(2) Date: Oct. 26, 2017

(87) PCT Pub. No.: WO2017/210005
PCT Pub. Date: Dec. 7, 2017

(65) Prior Publication Data
US 2019/0089720 A1   Mar. 21, 2019

Related U.S. Application Data

(60) Provisional application No. 62/343,264, filed on May 31, 2016.

(51) Int. Cl.
*H04L 29/06* (2006.01)
*G06F 21/52* (2013.01)
(Continued)

(52) U.S. Cl.
CPC ...... *H04L 63/1416* (2013.01); *G06F 16/9014* (2019.01); *G06F 16/9024* (2019.01);
(Continued)

(58) Field of Classification Search
None
See application file for complete search history.

(56) References Cited

U.S. PATENT DOCUMENTS 7,577,992 B2  8/2009  Abadi et al.
7,996,668 B2  8/2011  Diep et al.
(Continued)

FOREIGN PATENT DOCUMENTS

CN    103561018 A     2/2014
WO    2015149062 A1  10/2015

OTHER PUBLICATIONS

International Search Report and Written Opinion for PCT/US2017/033769 dated Jul. 31, 2017.
(Continued)

*Primary Examiner* — Taghi T Arani
*Assistant Examiner* — Lin Chang
(74) *Attorney, Agent, or Firm* — Thomas | Horstemeyer, LLP

(57) ABSTRACT

Various examples of methods and systems are provided for an attack detection system that can detect attacks in big data systems. The attack detection system can include security modules coupled to data nodes of the big data system. The attack detection system can identify a process executing on the respective data node. A process signature can be generated for the process executing on the data node. A determination of whether a big data system is being attacked can be based at least in part on a comparison of the process signature with at least one other process signature for the same process executing on another security module. The other process signatures are received via secure communication from the other security module.

17 Claims, 16 Drawing Sheets

(51) Int. Cl.
*G06F 21/55* (2013.01)
*G06F 21/56* (2013.01)
*H04L 9/32* (2006.01)
*G06F 16/901* (2019.01)

(52) U.S. Cl.
CPC ............ *G06F 21/52* (2013.01); *G06F 21/554* (2013.01); *G06F 21/56* (2013.01); *G06F 21/566* (2013.01); *H04L 9/3239* (2013.01); *H04L 9/3247* (2013.01); *H04L 63/0442* (2013.01); *H04L 63/1441* (2013.01)

(56) References Cited

U.S. PATENT DOCUMENTS

| | | | |
|---|---|---|---|
| 8,365,283 | B1 | 1/2013 | Satish et al. |
| 9,286,187 | B2 | 3/2016 | Brucker et al. |
| 10,203,968 | B1* | 2/2019 | Lawson ............. G06F 9/44521 |
| 2003/0097557 | A1 | 5/2003 | Tarquini et al. |
| 2004/0215972 | A1* | 10/2004 | Sung .................. H04L 63/1408 726/23 |
| 2006/0182133 | A1* | 8/2006 | Choumaru ............ H04L 45/745 370/401 |
| 2010/0310068 | A1 | 12/2010 | Fischer |
| 2011/0283115 | A1* | 11/2011 | Junod .................. H04L 9/0631 713/190 |
| 2012/0317553 | A1 | 12/2012 | Schmidt |
| 2013/0259228 | A1* | 10/2013 | Ren ....................... H04L 63/123 380/200 |
| 2013/0318607 | A1 | 11/2013 | Reed et al. |
| 2014/0156990 | A1* | 6/2014 | Dare ................... H04L 63/0823 713/156 |
| 2014/0325239 | A1* | 10/2014 | Ghose .................. G06F 9/3851 713/190 |
| 2015/0010148 | A1 | 1/2015 | Polzin et al. |
| 2015/0186645 | A1* | 7/2015 | Aziz .................. H04L 63/1433 726/23 |
| 2015/0207706 | A1* | 7/2015 | Li .......................... H04L 67/02 709/224 |
| 2016/0117502 | A1 | 4/2016 | Reed et al. |
| 2017/0046211 | A1* | 2/2017 | Jayawardena ...... G06F 9/45512 |

OTHER PUBLICATIONS

Aditham, Santosh, et al, "A System Architecture for the Detection of Insider Attacks in Big Data Systems", IEEE Transactions on Dependable and Secure Computing 15 (6), 974-987 (2018).

Aditham, Santosh, et al, "A Novel Control-flow based Intrusion Detection Technique for Big Data Systems", ArXiv preprint arXiv:1611. 07649, Nov. 23, 2016.

Aditham, Santosh, et al, "A Novel Framework for Mitigating Insider Attacks in Big Data Systems", Big Data (Big Data), 2015 IEEE International Conference on, 1876-1885 (2015).

* cited by examiner

SYSTEMS AND METHODS FOR DETECTING ATTACKS IN BIG DATA SYSTEMS

CROSS-REFERENCE TO RELATED APPLICATIONS

This application is the 35 U.S.C. § 371 national stage application of PCT Application No. PCT/US2017/033769, filed May 22, 2016, where the PCT claims priority to, and the benefit of, U.S. provisional application entitled "SYSTEMS AND METHODS FOR DETECTING ATTACKS IN BIG DATA SYSTEMS" having Ser. No. 62/343,264, filed on May 31, 2016, both of which are herein incorporated by reference in their entireties.

BACKGROUND

Big data systems are data driven and the work of big data systems can be classified into two major tasks: (1) writing user data to the disk for storage and (2) reading stored data when user requests the data. Typically, this data is quantified in units called blocks. For fast and fault-tolerant service, big data systems rely on replication of data blocks which in turn demands data consistency. Typically, the big data community assumes that the services used by a big data system to maintain data consistency are never attacked.

SUMMARY

Embodiments of the present disclosure are related to systems and methods for detecting and/or mitigating attacks in big data systems.

In one embodiment, among others, an attack detection system for a big data system comprises a plurality of security modules having a processor and a memory. Individual security modules of the plurality of security modules are coupled to a respective data node of the big data system. The attack detection system also comprises at least one application that is executable by the individual security modules. When executed, the at least one application can cause the individual security modules to at least identify a process executing on the respective data node, generate a process signature for the process executing on the data node, and determine whether the big data system is being attacked based at least in part on a comparison of the process signature with at least one other process signature for the same process executing on at least one other security module of the plurality of security modules. The at least one other process signature can be received via secure communication from the at least one other security module.

In another embodiment, among others, a system, comprising a distributed data system comprising a plurality of data nodes, an attack detection system comprising a plurality of security modules, and at least one application executable on the individual security modules. Individual security modules are integrated within a respective data node of the plurality of data nodes. The individual security modules comprise a processor and a memory, and are configured to securely communicate with one another via an independent security protocol. When executed, the at least one application causes the individual security modules to at least identify a process executing on the respective data node, generate a process signature for the process based at least in part on a control flow structure associated with the process, and determine that the distributed data system is being attacked. Determining that the distributed data system is being attacked can be based at least in part on a comparison of the process signature with at least one other processor signature for the same process executing on at least one other security module of the plurality of security modules. The at least one other process signature is received via a secure communication with the at least one other security modules.

In another embodiment, among others, a method comprises identifying, via a security module integrated within a data node of a distributed data system, a process executing on the data node, generating, via the security module, a process signature of the process based at least in part on a control flow structure of the process, receiving, via the security module, another process signature of the process from another security module integrated within another data node of the distributed data system, and detecting, via the security module, an attack on the distributed data system, based at least in part on a comparison of the process signature with the other process signature. The same process is executed on the other data node, and the other process signature is received via a secure communication between the security module and the other security module.

Other devices, systems, methods, features, and advantages of the present disclosure will be or become apparent to one with skill in the art upon examination of the following drawings and detailed description. It is intended that all such additional devices, systems, methods, features, and advantages be included within this description, be within the scope of the present disclosure, and be protected by the accompanying claims.

BRIEF DESCRIPTION OF THE DRAWINGS

Many aspects of the present disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
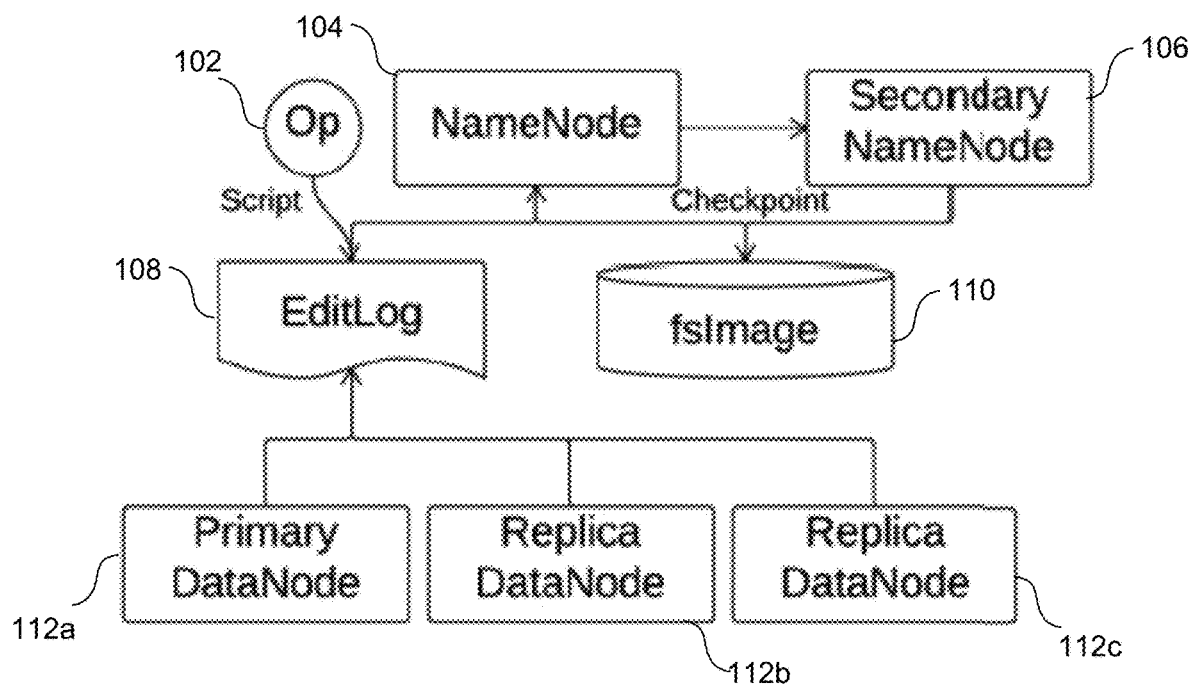
FIG. 1 illustrates a pictorial diagram showing a data loss attack of a big data system.

The present disclosure relates to systems and methods for detecting and/or mitigating attacks in big data systems. An attack (e.g., insider or intrusion) can be construed as an unauthorized manipulation of data by a process running on one or more nodes of the cluster. An attack detection system of the present disclosure is implemented within a big data system framework and is configured to (a) analyze control and data flow of every process run on a node, (b) suspect the possibility of an attack on the node, (c) securely share process related information with replicas in case of suspicion, and (d) confirm the attack and prevent the attack on other nodes within the data system. The attack detection system of the present disclosure does not incur any computation or memory overhead on the main processor and does not change the existing software programming model used by the big data system.

The attack detection system of the present disclosure comprises a mix of independent security modules that work together and reside on individual data nodes of the big data system. These security modules use a secure communication protocol to share packets of data with their counterparts on other data nodes of the cluster. The data shared among the security modules in the system architecture contain vital information about the analysis of a process. Hence, all data transferred by any data node using this secure communication channel is encrypted upfront using private key encryption.

The security modules can comprise special purpose hardware that is configured to implement an attack detection algorithm and a secure communication protocol to analyze processes executing in the system. Specifically, the security modules are configured to (1) identify process signatures of processes being executed by the nodes, (2) provide secure communication between each of the nodes, and (3) detect an intrusion and/or insider attack on the data system by comparing the processes signatures of the different nodes.

Analysis of processes to identify insider attacks is a main function of attack detection system of the present disclosure. An attack in big data systems can be construed as unauthorized manipulation of data by a process running on one or more nodes of the cluster. While known coprocessors are capable of performing process level dynamic information flow tracking (DIFT) analysis with very low overhead, control flow instructions are more vulnerable to attacks than any other type of instructions in modern processors. Hence, it is safe to assume that the control flow of a process must indicate the possibility of an attack. Control flow of a process can be analyzed before or after the process is scheduled. Analyzing a process after it is scheduled is beneficial to the attack detection system and big data systems in general for three reasons: (1) easy to delegate to special hardware, (2) no impact on performance of the system, and (3) a program can be modified anytime by an insider before its object code is scheduled. Hence, for various embodiments of the present disclosure, process analysis of the attack detection system is limited to monitoring the control flow instructions from the disassembled object code (DOC) of a process that is generated using recursive traversal.

According to various embodiments, the security modules of the attack detection system can comprise a disassembler configured to convert scheduled object code (process) to assembly code. A disassembler that uses recursive traversal can be able to restore the control flow of the program in its output assembly code.

In one embodiment, the assembly code of a process running on a primary node is analyzed and an attack probability score (APS) that captures that control structure of the code is calculated. The APS of a process is unique to the structure of that process and is derived from the control-flow instructions and any applicable data. The APS score along with the control and data stacks are maintained in the replica nodes. When the same process is executed at the replica nodes, the APS can be computed dynamically and matched with the stored APS from the primary node. If there is a mismatch indicating a possible attack, the control and data flow stacks are matched in sequence to detect attacks.

In another embodiment, the attack detection system analyzes the control instruction sequences (CIS) for each process in the system. First, program profiling is performed by individual nodes of the big data cluster on the processes they execute. In this step, process binaries of scheduled processes are disassembled and analyzed to generate control instruction sequences (CIS). These sequences are then hashed, encrypted, and shared among data nodes that host the same data (e.g., primary and replica nodes). Next, consensus among data nodes is achieved regarding the possibility of a process being attacked. This step involves two phases: hash matching and information sharing. Upon receiving encrypted messages from primary nodes, the replica nodes apply sequential, on-demand string matching between the locally generated hash and the received hash. Next, the result of this comparison is shared with the primary node. Depending on the results received, the primary data node notifies the master node to take necessary recovery measures. All communications among data nodes are performed using a secure communication protocol that is based on public-private key encryption.

In another embodiment, the attack detection system detects program level intrusions in big data systems with help of control flow analysis. The main idea is to use the replication property of big data systems and check for coherence in program behavior among replica data nodes. Behavior of a program is modeled by extracting a minimum spanning arborescence (MSA) set representation of its control flow graph (CFG). Similarity check among duplicate programs is performed by a complete matching among hashed sets of MSAs. For example, a process signature can be created by reducing the control-flow graph of a process to a set of minimum spanning trees and then creating a hash of that set. The process signatures of other nodes in the data system executing the same process are exchanged via secure communication. A similarity in process behavior is determined by matching the local process signature with a received process signature. The results are shared with all the replica data nodes for consensus.

Two popular big data services includes reads and writes. When a client (or user) wants to write a block, the namenode picks n data nodes from the big data cluster to complete this task where n is the replication factor of the cluster. First the namenode checks if the data nodes are ready. It sends a ready request to datanode1 which when ready, forwards that request to datanode2 and so on. When the namenode knows that all n data nodes are ready, the namenode asks the client to start writing. The client only writes to datanode1 which is subsequently written on to datanode2, datanode3 and so on. In case of any failure, namenode orders a new data node to maintain block replicas. When the client wants to read a block, namenode gives the client a list of all data nodes that have the block and the client picks first data node. If there is a problem reading from datanode1, the client request gets forwarded to the next data node that has a copy of the same block.

Big data services are implemented on clouds. Different users connect to the cloud structure which is a broadly implemented heterogeneous distributed system. The end user can store large volumes of data in the cloud and the data is managed by big data services. Storing user data in datacenters and gathering information from that stored data is referred to as data science or data analytics which is the prime business trend currently.

One example big data system is MapReduce which efficiently process large data sets in parallel. Another big data system is the Hadoop® system which is an open source platform built on the MapReduce model. Another big data system is Apache Spark which is based on a general engine for large-scale data processing with in-memory MapReduce.

A major bottleneck in the use of big data services is the lack of trust in security. Users of big data systems are skeptical about hosting their data away from them. Many companies are hesitant to adapt big data services due to the possibility of insider attacks. Cyber attackers are able to successfully hack into the data of small, medium and large organizations everyday irrespective of the numerous security systems in place. As such, there is a need for a security model for big data systems in which insider attacks can be eliminated. The security methods and the encryption keys of such a security model should be non-transparent to all entities within the system.

Known security methods for big data systems are predominantly software based. For example, Hadoop® uses Kerberos for security whose quality of protection is limited to strong authentication. Log analysis and access control lists also contribute towards security in Hadoop®. However, these methods are susceptible to insider attacks. Symmetric key encryption has been suggested as a reliable and fast way to secure data in Hadoop® but the requirement to share access tokens among nodes in the cluster makes data vulnerable. Another suggested method for big data systems relates to attack tolerance for big data systems through redundant fragmentation where stripe data chunks are stripped and re-assembled. However, there are no known results related to the overhead involved.

Another known method for big data security relates to using hardware security chips (e.g., trusted platform module (TPM) chip) for big data security. However, this solution is not feasible for large clusters that run real-time analytics services on petabytes of data. Another known approach is based on non-decreasing counters and shared symmetric key encryption. While this approach eliminates the need for trusted hardware, it is only applicable to equivocation-type misbehavior and is not scalable. Ascend is a known data privacy conserving scheme for cloud-like environments which obfuscates instructions of a program to implement data privacy. However, this known approach comes at a cost of modifying the ISA, average slowdown of 10-15% and no proper limits on obfuscation. Another known approach uses a dedicated tag coprocessor and memory for dynamic instruction flow tracking. With a slowdown of less than 1% these coprocessors need to be synchronized with the main processor core and are confined to individual machine level security.

Big data solutions are widely adopted across various government and enterprise domains like software, finance, retail and healthcare. Big data applications are pioneering in the field of advanced data analytics and have a projected market of approximately fifty billion dollars by 2018. The most frequent use-cases of big data are information retrieval from complex, unstructured data; and real time data analysis. Along with its rapid market growth, the big data trend also has its share of challenges and risks. In an era where extracting information from data is sanctioned to all, users are understandably more skeptical to let providers host their data away from them. This, along with the recent increase in the number of cyber-attacks, boosted the importance for security. Yet, the losses due to boundless security holes in existing systems seem to overshadow the investments towards increasing their security. Hence, there is an immediate need to address architectural loopholes in order to provide better security. For instance, current big data security platforms focus on providing fine-grained security through extensive analysis of stored data. But such models indirectly facilitate the abuse of user data in the hands of the provider. Insider attacks are becoming more common and are considered the toughest attacks to detect. There does not exist much in the literature on solutions for insider attacks in general. Though privacy and security are touted to be important problems in the big data world, the solutions concentrate only on leveraging big data systems for efficient security in other domains. There is no known robust solution for detecting or preventing insider threats within big data infrastructures. For example, security mechanisms of popular big data systems like Hadoop and Spark include thirdparty applications like Kerberos, access control lists (ACL), log monitoring and data encryption (to some extent). But for an insider, especially a traitor, circumventing these mechanisms is not difficult. It is crucial to address the problem of insider attacks in big data systems for three main reasons: (a) traitors within the providers organization will be able to circumvent the security system in place, (b) sensitivity of customer information stored in the system is increasing by day, and (c) there is no consensus or widespread agreement on well-defined security standards in the big data community.

Recently, two unauthorized backdoors were discovered in Juniper Networks firewalls that might have given attackers access to highly classified information. Some important facts about this particular hack are: (a) it comes at the cost of compromising national security, (b) it shows that even a major network security company is vulnerable to attacks, (c) in spite of the high stakes and vast resources, it is believed that these backdoors were left undiscovered for almost three years, and (d) it was reported that the attackers could have deleted the security logs. This is one of the many examples to show that the efficiency of common attack prevention techniques, like identity management, ACLs and data encryption, is necessary but sufficient to prevent attacks. As per OpenSOC, in 60% of breaches data gets stolen within hours of the breach and 54% of breaches are not discovered for months. This indicates that infrastructures need to have efficient attack detection techniques along with strong attack prevention techniques for robust security. In the big data world, it is considered that moving computation to where the data resides is better than the traditional approach of moving data for computation. The main features of big data infrastructures are fast data processing, high scalability, high availability and fault-tolerance. Availability and fault-tolerance of big data systems comes from intelligent replication of data. This implies single instruction, multiple data (SIMD) style, parallel execution of the same program at multiple locations. When a program is scheduled for execution on the big data cluster, it runs as an individual process on every data node that hosts a copy of the program data. The replication of data on various nodes in the big data system can be utilized in providing security. Security for a computing system can be implemented at hardware and software level. Given the advantage of isolation that can be achieved at hardware level security, the attack detection system delegates security to special purpose hardware that resides on the nodes of the big data cluster. Such an infrastructure will have the advantages of (a) performing security analysis remotely, (b) reducing the overhead on main processor by delegating security, and (c) significantly decreasing the cost of data transfer while providing efficient security techniques like isolated vulnerability scanning through program profiling.

Hadoop Overview

The embodiments of the present disclosure can be implemented on different types of big data systems such as, for example, Hadoop®. An overview of the Hadoop® architecture and security model is provided below.

Architecture

The two major components of Hadoop® are the Hadoop® distributed file system (HDFS) and MapReduce. HDFS serves as the distributed file system used to store massive data sets and MapReduce is used for data processing on HDFS. Hadoop® follows a master-slave architecture to mitigate costs related to data processing, exception handling and attack recovery. Namenode acts as master of storage (HDFS) and manages all metadata related to the file system. Data nodes are slaves of Namenode and are used to store the actual data, in blocks. JobTracker acts as a master of processing (MapReduce) and manages the jobs and their access permissions at cluster and user levels. TaskTrackers are slaves of JobTracker and are used to complete the map or reduce jobs allocated by their master. More recent versions of Hadoop® have another major component called Yet Another Resource Negotiator (YARN) for resource management. Namenode, datanode, jobtracker, tasktracker and all YARN components are all daemons that run on a cluster of machines. Together with all the services provided by the Hadoop® ecosystem, this cluster of machines is called a Hadoop® cluster. The basic workflow of Hadoop® has four steps: (1) HDFS write to load data into the cluster; (2) MapReduce to analyze data in parallel; (3) HDFS write to store results in cluster; and (4) HDFS Read to read results from cluster.

Hadoop® Security Model

Hadoop® security model is built on three pillars: multi-level authentication, log-based analysis, and encryption. Strong authentication is provided to Hadoop® by Kerberos which is an integral part of the Hadoop® ecosystem. Newer versions of Hadoop® have an option to configure the Hadoop® cluster in secure mode which supports multiple levels of authentication. Activity at any level inside a Hadoop® system is logged with the help of in-built services like log 4j. These logs are extensively used by the system level services and administrators for various management purposes such as understanding resource utilization and security monitoring. Encryption is an option available in the recent versions of Hadoop® to support data confidentiality between services and clients. Other software services like Zookeeper, Storm, and several other open jiras, for example, are continuously working on improving Hadoop® security. Problems of Hadoop® security services include: (1) having centralized control (e.g., Kerberos, Bastion boxes, Zookeeper etc. need synchronization and incur delay in risk assessment and recovery), (2) being integral to the system (e.g., security services built into the Hadoop® ecosystem need to be implicitly trusted), (3) acting as a burden on the main processor (e.g., even the optimized encryption/decryption standards like AES-NI, for example, need a minimum of two real central processing unit (CPU) cores for efficiency), and (4) coming with unreal assumptions (e.g., users cannot have access to machines in the cluster that store their data).

Attack Simulations for Hadoop®

There are many possible attack scenarios for Hadoop®. For example, malicious code can misuse the software coprocessor feature at region servers. Insiders from a Hadoop® operations (ops) team can misuse their power and compromise user data. For example, insider attacks can be related to log files in Hadoop®. Log file analysis is one of the pillars to providing security for Hadoop. The two example attack scenarios include (a) an insider from Hadoop® ops team who has access to a machine/log file can modify or delete it, leading to data loss and (b) an insider from system admin team can tamper with log data which leads to faulty results. These scenarios are discussed below.

Data Loss: Metadata about the cluster file system is stored on Namenode in two parts: (1) fsImage that is used when the HDFS services are started and (2) EditLog that is updated constantly (hdfs-default.xml or hdfs-site.xml has the configuration settings related to this). As per the initial Hadoop® architecture, Namenode was a single point of failure. But using a secondary Namenode to store HDFS information resolves this problem in most cases. Also, the secondary Namenode helps in making the file system updates invisible to the user. This is done by having periodic updates to the fsImage on secondary Namenode with the help of local EditLog and dumping the resultant fsImage to Namenode in a snapshot. In this scenario, if an attacker (insider from Hadoop® ops) modifies the EditLog on secondary Namenode, the next checkpoint will reflect that change on the fsImage of Namenode which can lead to data loss.

Figure 2:
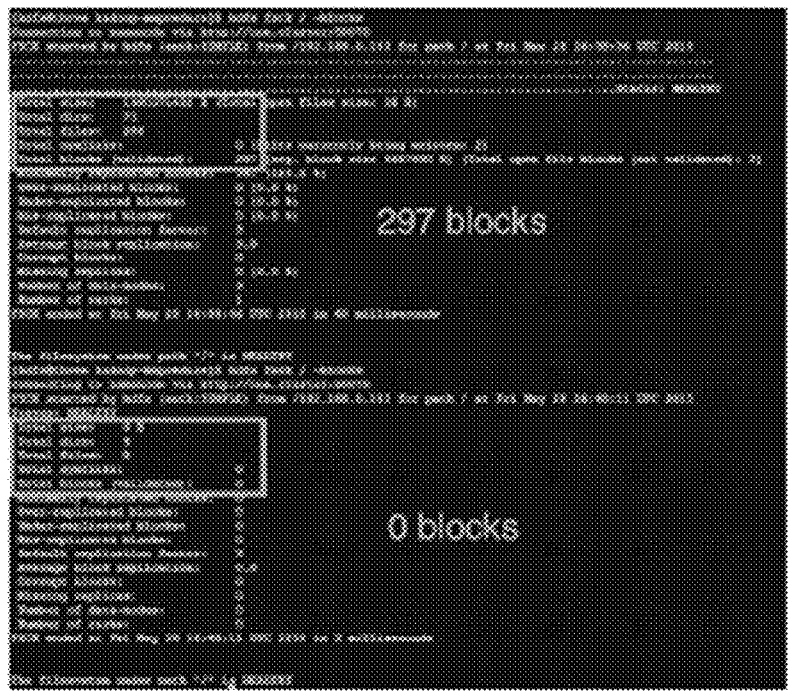
FIG. 2 illustrates results of the data loss attack of FIG. 1.

A high level model of a data loss attack is shown in FIG. 1, and the results 200 of the attack are shown in FIG. 2. The Hadoop-based data system 100 of FIG. 1 comprises a Namenode 104, a secondary Namenode, an edit log 108, an existing file system 110, and data nodes 112 (e.g., 112a, 112b, 112c). In FIG. 1, Op represents an insider 102 from the data system ops team. As shown in FIG. 2, the file system originally had 297 data blocks. However, after the EditLog 102 on secondary namenode 106 is modified, the existing file system 110 (e.g., fsImage) is completely erased. This change is reflected in the Namenode 104 at the next checkpoint.

Figure 3:
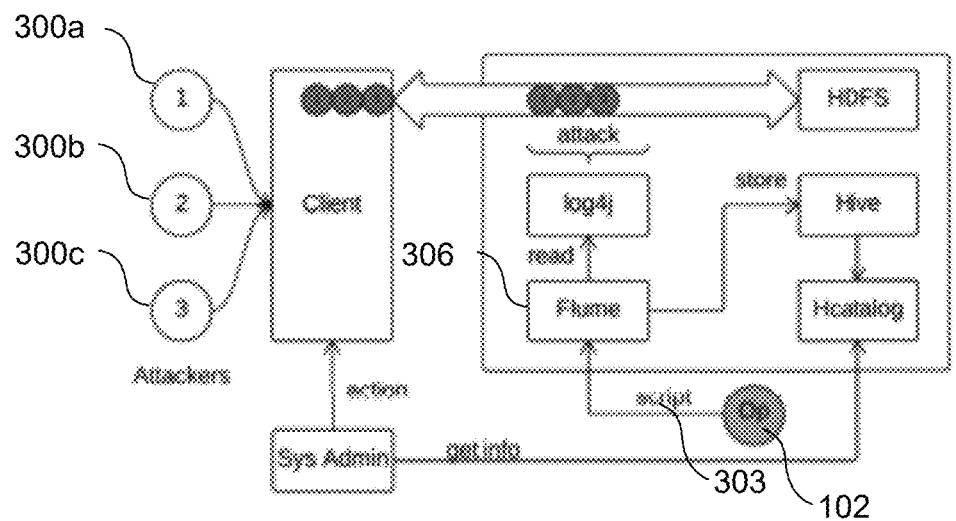
FIG. 3 illustrates a pictorial diagram showing an insider attack of a big data system.
Figure 4:
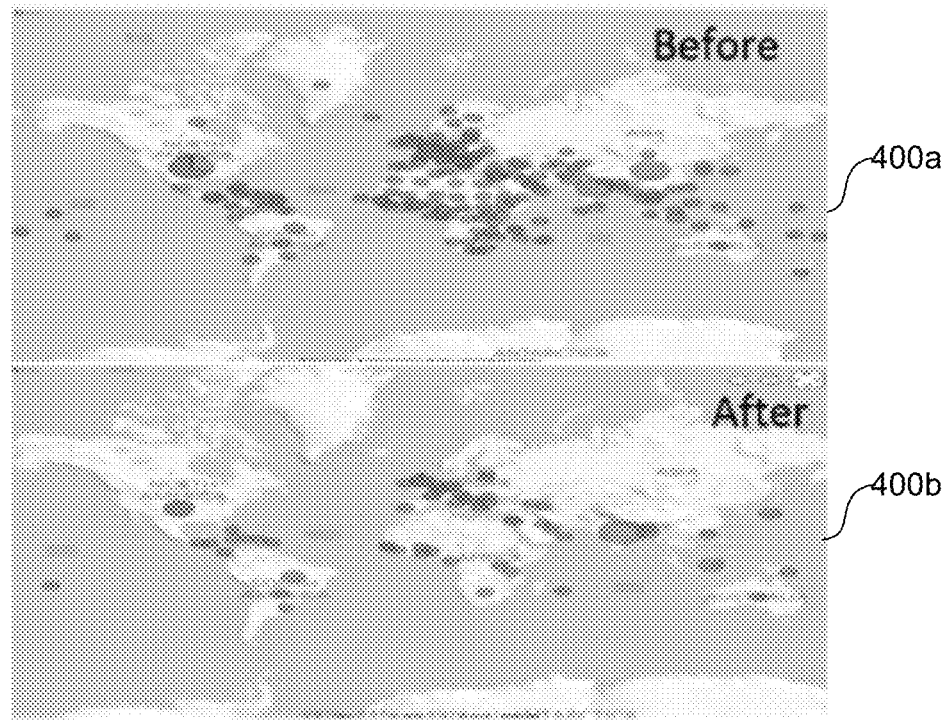
FIG. 4 illustrates results of the data loss attack of FIG. 2.

Faulty Results: Data system logs are mostly used for management purposes. From a security standpoint, server logs are used by system admins to identify potential attacks on the system. Log data can be stored in structured formats like tables using Hadoop® scripting languages such as, for example, Pig and Hive. A system administrator can then use business intelligence (BI) tools like Microsoft Excels, for example, to easily analyze the structured log data. One example of system log monitoring where distributed denial-of service (DDOS) attacks are being tracked down by system administrators, a Hadoop® service called Flume is used for streaming data transfer of Hadoop® logs into Hcatalog which is a structured query language (SQL) based Hadoop® data store. In this scenario, an attacker (insider from system admin) can alter the results by modifying the log data before Flume can stream it into Hcatalog. A model of this attack scenario is shown in FIG. 3 where Attacker 1, Attacker 2, and Attacker 3 are examples of DDOS attack requests 300 (e.g., 300a, 300b, 300c) from client side 306 that will be logged by the system. A malicious script 303 from an insider 102 on the data system operations side (e.g., an insider job) is run on the system that would modify log data before Flume 306 starts streaming it. As shown in FIG. 4, results can be tainted by attacks on log files even though Hadoop® services seem to be working as expected. The part of FIG. 4 labeled Before 400a shows the actual data of origins of user requests and attacks while the part labeled After 400b shows the modified output.

Security System Architecture and Security Protocol

According to various embodiments of the present disclosure, the attack detection system is designed to fit any big data system running on a cluster of machines/nodes. Although the Hadoop® is discussed as an example, the attack detection system of the present disclosure can be implemented with any type of big data system as can be appreciated. It is important to note that big data systems move compute closer to data, in parallel, to reduce processing time and cost per gigabyte (GB). This scale-out capability of a big data system signifies that processors in the cluster should be dedicated towards data processing. Hence, the attack detection system of the present disclosure is designed to be able to delegate and decentralize the security aspect of a big data systems to dedicated hardware that is present on each node in the cluster that work locally and independently.

Figure 5:
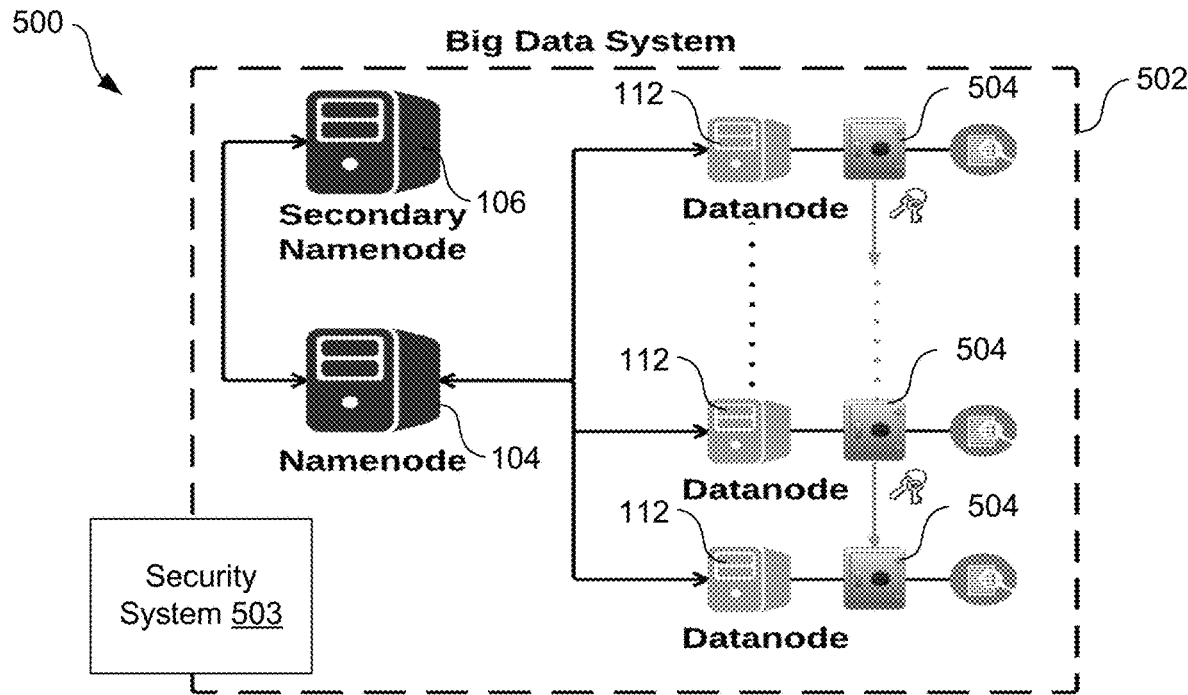
FIG. 5 illustrates an example of the attack detection system of the present disclosure according to various embodiments.

FIG. 5 illustrates an example of the attack detection system 500 of the present disclosure according to various embodiments. Specifically, FIG. 5 illustrates the attack detection system 500 implemented in a big data system 502. The big data system 502 of FIG. 5 comprises a Hadoop® cluster that includes a namenode 104, a secondary namenode 106, and data nodes 112. The big data system 502 further comprises a security system 503, such as, for example, Kerberos, and/or any other suitable type of software based security system of a big data system 502. However, it should be noted that the attack detection system is not limited to use with a Hadoop® data system. The attack detection system 500 comprises a plurality of security modules 504 coupled to the plurality of data nodes 112 of the big data system 502. According to various embodiments, the security module comprises a processor and memory. In some embodiments, the security module 504 further comprises fast crypto-support.

According to various embodiments of the present disclosure, the security modules 504 are configured to at least (1) generate process signatures of processes executing on the respective node, (2) securely communicate with other data nodes 112, and (3) compare the local process signature with received process signatures to detect an attack on the big data system 502. In the case of big data systems 502, data security needs secure communication because of cluster-level deployments. Thus, the hardware architecture for the security module 504 in big data system 502 needs to be able to at least analyze processes, store sensitive data and keys, execute key based cryptographic operations and securely communicate with replica data nodes 112.

In some embodiments, the memory of the security modules 504 may comprise stack data structures to store instructions and data values of a process under suspicion, a static map to store all possible control flow instructions of the underlying instruction set architecture (ISA), registers to store the hardwired on-chip key that serves as a master key and other intermediate keys used for encryption and/or other appropriate structure.

In some embodiments, the processor of the security modules 504 may comprise hardware capable of running encryption algorithms to create packets for secure communication among other nodes 112, hardware capable of performing analysis of disassembled object code (DOC), calculation of process signatures, and secure communication with other nodes 112, and so on.

Data replication is key for high availability and performance in big data. The default replication factor for a Hadoop® cluster is three (i.e., a block in HDFS has three copies: one primary copy on a node and two other replicas on two other nodes in the cluster). The general block placement approach is to have one replica of the data in a node physically close to the primary copy (i.e., same rack and another replica on a node that belongs to a separate rack). Hence, a job (computation) on the primary copy of a particular dataset needs to be replayed at two other locations. For this, the namenode 104 schedules three separate but identical jobs for all three copies of data in a sequential order. Compromising any one of these three identical jobs can lead to a successful attack on the system. The attack detection system 500 of the present disclosure is designed such that the security modules 504 at each node 112 can take advantage of this replication property and use it for providing security against attacks in the big data system 502.

According to various embodiments of the present disclosure, the security modules 504 of the attack detection system 500 are configured to securely communicate with one another. Similar to other on-board hardware security chips (e.g. the trusted platform module (TPM) chip), the security protocol implemented by the attack detection system 500 of the present disclosure provides secure keys which can be used to establish dedicated communication channels among nodes 112. A unique hardcoded master key can be used to generate all public-private key pairs for data encryption and decryption. Once a process is analyzed and a process signature is created, the detection attack system 500 will evaluate every process in the system for complete security. Process information of the process under suspicion can shared securely with other replicas to confirm or deny an attack. Upon generating a process signature, a packet can be created on a security module 504 that contains the process signature. The packet is encrypted with a private key and the associated public key is shared with the other nodes 112. This public-private key pair is unique to a node 112. In some embodiments, the public-private key pair of a node 112 can be periodically updated.

Insider Attacks

Figure 6:
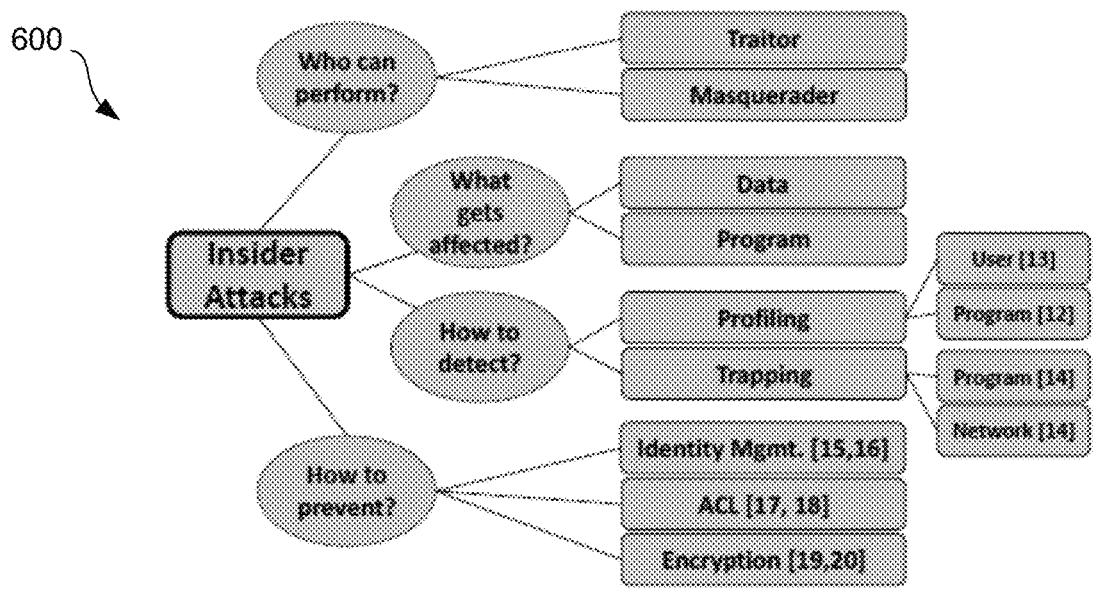
FIG. 6 provides a pictorial diagram illustrating a list of entities to consider when dealing with insider attacks.

Though security in general computing has been extensively studied and implemented over the years, computers are still vulnerable to attacks. Software based attacks that typically target a computer network or system, called cyberattacks, are growing in their frequency and impact. The plot for any type of software attack involves exploitation of a piece of code that runs on a computer. It is inherent to this perspective about a cyberattack that security can be provided at two levels: (a) by the software that is used to compile and execute the program and (b) by the hardware that runs the program. Providing security at software level gives more context and information about the target programs that are being protected. But this comes with the risk of the security software itself being compromised. On the other hand, having security at hardware level gives more isolation to the process of analyzing and securing programs though it becomes difficult to give detailed context about the programs and the infrastructures running them. In any case, the toughest software attacks to counter are the ones whose genesis is intentional and are performed by those who have a good understanding of the underlying system. Such an attack can be implemented in any organization when there is collusion among the right set of employees. Four major questions can guide towards better handling of insider attacks: (a) who can perform these attacks, (b) what gets affected, (c) how to detect these attacks, and (d) how to prevent them from happening. FIG. 6 provides a pictorial diagram 600 illustrating a list of entities to consider when dealing with insider attacks. FIG. 6 further shows the four questions, from above, as relationships among the entities. Insider attacks can be performed by (a) traitors who are legally a part of the system but want to misuse the access privileges given to them and (b) masqueraders who get access to the system by stealing identities of those who have legitimate access. Insider attacks can affect the proper functionality of a program or corrupt the data used by the programs. Profiling and trapping are two most common ways to detect insider attacks. Profiling can be performed at the program level and at the user level. Traps can be set in the programs or in the network to force the attacker into performing certain actions that help towards exposing the attack. The biggest concern with these insider attack detection methods is the possibility of losing valuable data. Hence, known insider attack prevention mechanisms like identity management, access control lists, data encryption, etc. must be employed at the same time.

Example 1: Detecting Insider Attacks

In some embodiments, the attack detection system 500 of the present disclosure detects attacks to big data systems using a process signature that is based in part on an attack probability score (APS) associated with the control structure of the assembly code of a process being executed by the primary node.

Figure 7:
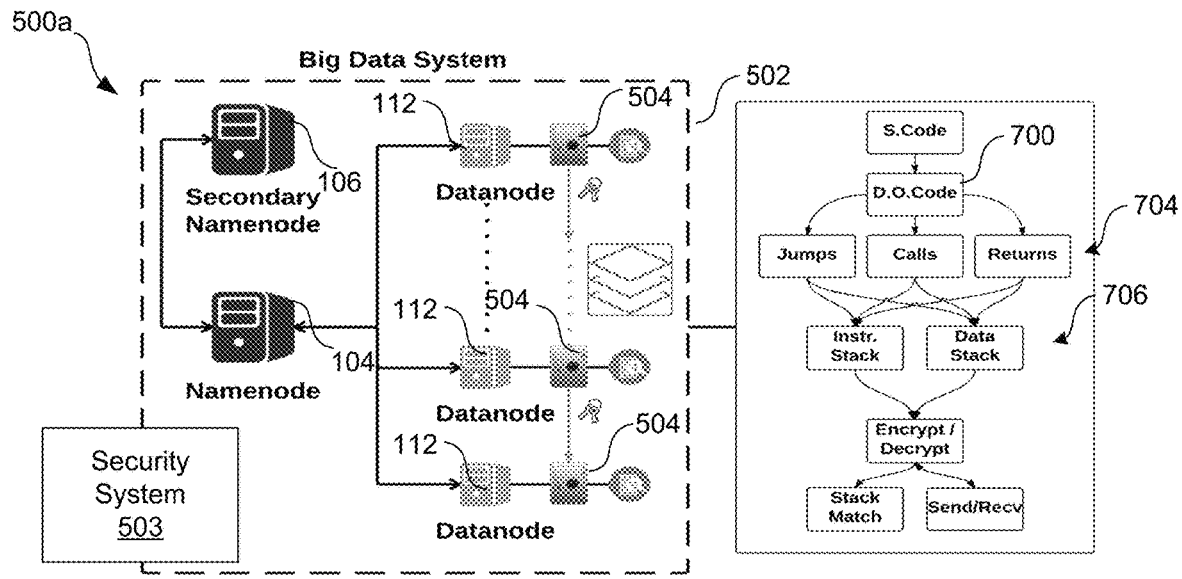
FIG. 7 illustrates a pictorial diagram of an example of the attack detection system of FIG. 5 implemented within a big data system according to various embodiments of the present disclosure.

FIG. 7 illustrates a pictorial diagram of an example of the attack detection system 500a implemented within a big data system 502 according to various embodiments of the present disclosure.

A simple scan of the DOC 700 for predefined control flow instructions 702 can be used to detect possible areas of vulnerability in the code. However, not all control flow instructions 704 in the DOC 700 can (or) will lead to an attack. Identifying an attack based on DOC level process analysis can be tricky for big data systems 502 due to the possibility of false positives. An authorized administrator might be modifying the data as part of maintenance. Hence, a rule engine that categorizes instructions and data depending on their risk factor will be used while scanning the DOC 700 of a process. Ideally, a rigorous rule engine is needed here that can differentiate attacks from authorized tasks. Table I provides an example of a rule engine with example rules that are based only on few basic control flow instructions and data inputs.

TABLE I

| sno | Rule | APS |
|---|---|---|
| 1 | call delete, call rename | very high |
| 2 | jump indirect | high |
| 3 | return | medium |
| 4 | all non-control flow instructions | low |
| 5 | all NOP instructions | very low |

Such rule based process analysis is only a necessary but not a sufficient condition to confirm an attack in big data systems. Confirmation of an attack can be achieved through consensus which needs communication among replicas. For such consensus, a node 112 which suspects an attack on a primary copy of data must be able to convey the same to its replicas 112 using a simple message. For example, the simple message may comprise a process signature based in part on an attack probability score (APS).

According to various embodiments, an APS is introduced in the attack detection system 500a such that a node 112 with primary copy of data can convey about a possible attack in a process to all the replica nodes 112. APS is important because it can alleviate the cost of comparing instruction and data stacks 706 for every process at replica nodes 112. The APS is based in part on a percentage of custom factory integration (CFI) of a process because the APS can: (a) capture the control flow property of a process to some extent, (b) ensure same output for a process on any node, (c) calculate easily, independently & internally by secure coprocessors, and (d) be used to sort processes in the matching portion of the attack detection system implementations such that processes with high APS are compared first because they have higher chances to be attacked. APS value does not indicate if a process has been attacked or not. It is merely a process representation technique. APS is given at two levels: instruction and process. At instruction level, this score signifies attack probability of the instruction. Instructions and their APS are stored in a look-up table. APS values of individual instructions will be unique because they are derived based on the vulnerability quotient of the instruction.

For example, as per general convention, a call or an indirect jump instruction is more vulnerable to attacks than an ADD instruction. At process level, APS has to represent a process based on process properties. Hence, a logarithmic scoring rule, as given in Equation 1, can be used to calculate APS of process.

$$APS_{process} = X \cdot \log P + (1-X) \cdot \log(1-P) \quad (1)$$

Here, X is a Boolean value to indicate if the process is attacked or not and P is the probability of having an attack. The probability P is calculated using Equation 2 where a process has n instructions out of which k are CFI.

$$P = \frac{\sum_{cfi=0}^{k} APS_{cfi}}{\sum_{cfi=0}^{k} APS_{cfi} + \sum_{noncfi=0}^{n-k} APS_{noncfi}} \quad (2)$$

Figure 8:
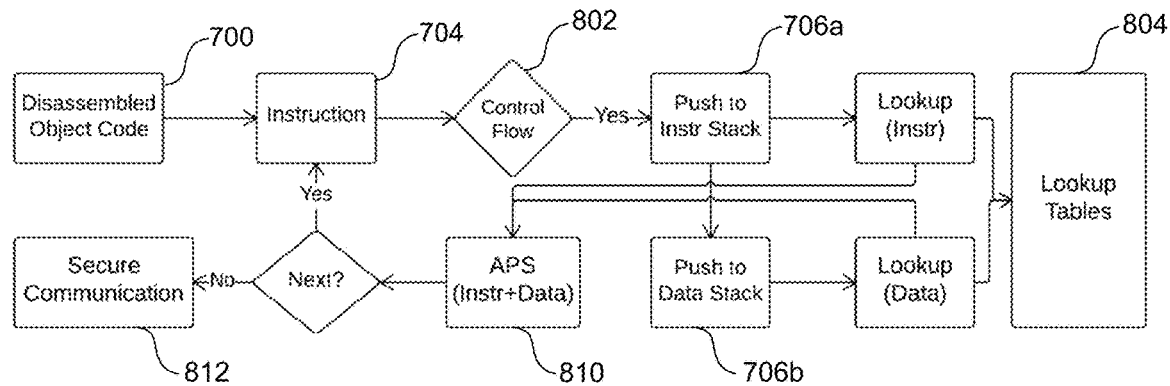
FIG. 8 is a flowchart illustrating one example of a method to follow while calculating APS for a given DOC according to various embodiments of the present disclosure.

During the compare stage, a node can sort the processes to compare, depending on the APS value of each process such that processes with more control flow instructions can be compared first. FIG. 8 is a flowchart illustrating one example of a method to follow while calculating APS 810 for a given DOC according to various embodiments of the present disclosure. From the DOC 700 of a program, the first step is to filter the control flow instructions (CFI) 802. These CFI 802 are pushed to the instruction stack 706a in their order of appearance in the DOC 700. While doing so, the lookup table 804 is referred to calculate the APS 810 of that instruction. Next, the same steps are followed for the data field of the instruction. For example, the CFI 802 are pushed to the data stack 706b and the lookup table 804 is referred to calculate the APS 810. Here, the focus is more on the registers or memory locations used but not on the actual values of the data field. Thus, APS 810 of an instruction is the sum of APS of its instruction code and data location. For all non-CFI, the APS value should be predefined to a value much lesser than its CFI counterparts.

Process analysis using DOC 700 and an established rule engine can be very simple and straightforward with the help of appropriate data structures. A <key, value> pair format can be used to represent a control flow instruction and the APS of the control flow instruction. According to various embodiments, a lookup table 804 can be maintained and all control flow instructions 704 and associated APS 810 can be contained in static memory of the security module that is performing the process analysis. This will help in faster access while retrieving APS of instructions and will not consume much memory.

For example, assume that an instruction in DOC 700 follows the format of opcode <arg1, arg2> where arguments arg1 and arg2 can be registers and/or constants. In some embodiments, two separate stack data structures: Instruction Stack and Data Stack per process can be configured to analyze DOC 700 of that process. Having only push and pop operations makes stacking a good fit to preserve the sequence of instructions and precisely identify the attack. This approach can be associated to phase analysis where the way a program traverses the code during execution is captured and analyzed. Also, while confirming an attack, a complete scan of non-identical stacks is not needed, which leads to faster analysis. Finally, having different stacks for instruction and data of each process makes data transfer, encryption and decryption more modular.

Process analysis identifies a possible attack on the primary copy of data. For consensus among replica nodes 112 to confirm the attack and to take any recovery or prevention steps, the replica nodes 112 need to be able to securely communicate among themselves. According to the secure communication protocol 812 of the present disclosure, once the DOC 700 of a process is analyzed, an APS 810 is associated to the process is computed. Every process in the system can be evaluated for complete security. Next, process information of the process under suspicion is shared securely with other replicas to confirm or deny an attack. A packet for this process is created on the node with the primary copy of data which contains the instruction stack 706a, data stack 706b, and APS 810 of the process. The packet is encrypted with a private key and the associated public key is shared with the replica nodes 112. This public-private key pair is unique to a node 112. Periodically updating the public-private key pair of a node 112 is a design decision open to the users.

Figure 9:
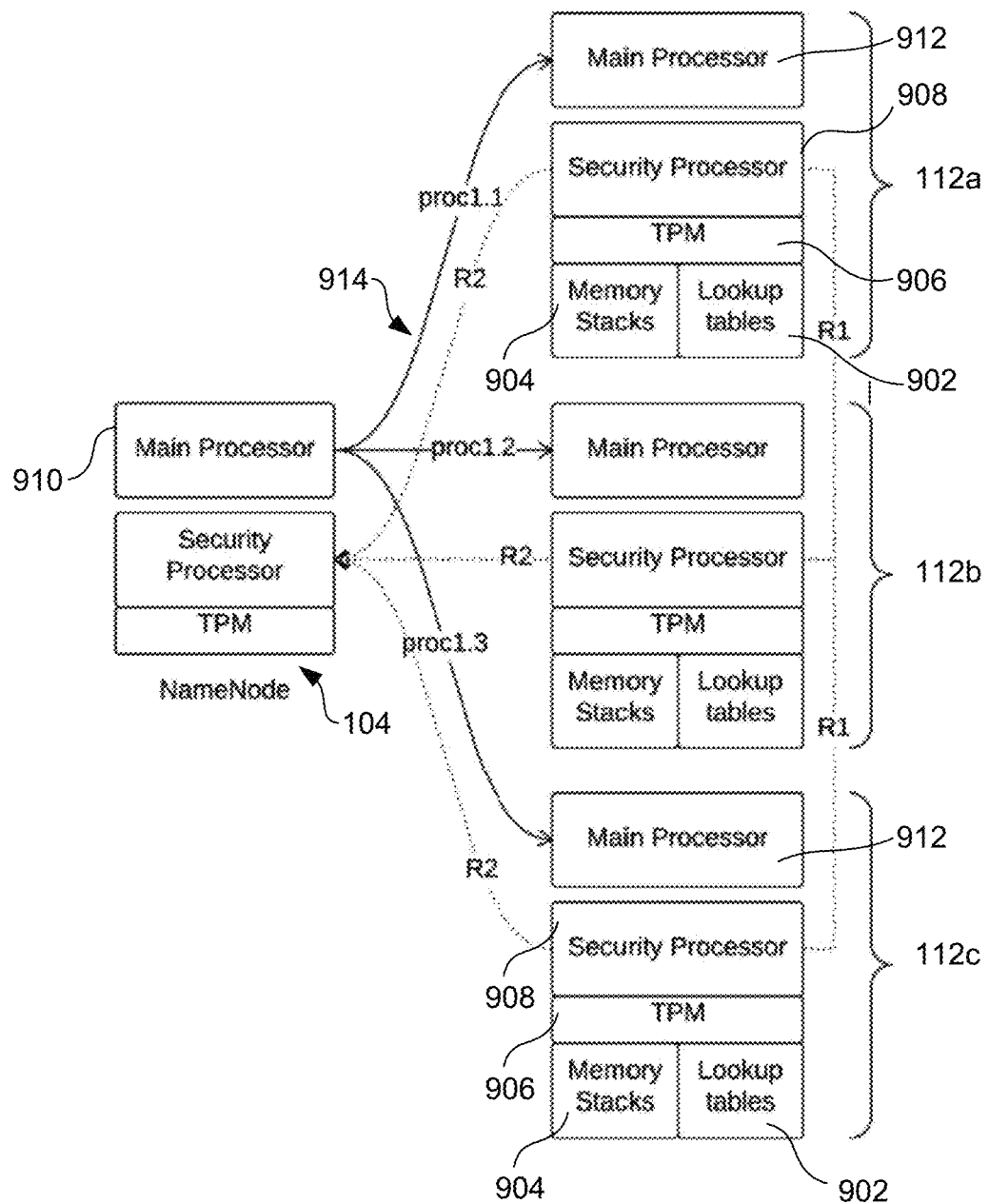
FIG. 9 illustrates an example of the secure communication of the attack detection system of FIG. 5 in a Hadoop® cluster according to various embodiments of the present disclosure.

FIG. 9 illustrates an example of the secure communication of the attack detection system 500 in a Hadoop® cluster according to various embodiments of the present disclosure. From FIG. 9, it can be noticed that according to some embodiments, the attack detection system 500 mainly contains 4 parts: static memory 902 for lookup tables, dynamic memory 904 for data and instruction stacks, trusted platform module (TPM) chip 906 that can generate keys and finally a processor 908 to take care of process monitoring and secure communication. It can be observed from FIG. 9 that the attack detection system 500 of the present disclosure works in parallel (dotted lines) with the namenode processor 910 and data node processors 912 of a big data system 502. FIG. 9 shows how the secure communication protocol of the present disclosure fits in a common workflow of a Hadoop® cluster. First, the namenode 104 receives a job request prod from the users to which three identical jobs proc1.1, proc1.2 and proc1.3 are scheduled by the namenode 104 on three data nodes 112 (e.g., 112a, 112b, 112c) that host the required data and replicas in the Hadoop® cluster. These regular communication channels 914 are indicated by solid lines in FIG. 9. According to various embodiments of the present disclosure, these processes undergo process analysis at data nodes, and packets of information about the processes are created in case of an attack suspicion. For secure transfer of those packets within the associated replicas in the cluster, the primary data node 112a shares public keys represented by R1 with the replica data nodes 112b, 112c. Each data node 112 also shares another set of public keys represented by R2 with the namenode 104 for secure data node to namenode communication. The R2 keys are used in case of complete attacks and recovery steps. The secure communication protocol of the present disclosure is designed in a way to fit the use of dedicated hardware on each node 112 in the cluster, as observed in case of process analysis step.

Algorithms

Two algorithms can be implemented in the attack detection system 500a according to various embodiments of the present disclosure. Algorithm 1 illustrates an example of an algorithm that may be implemented that is directed to locally detecting the possibility of an attack on the primary copy of data.

---

Algorithm 1

Algorithm 1: Algorithm for process analysis on node with primary copy of data

---

Data: Disassembled Compiler Code (DOC) of a process

Algorithm 1

Algorithm 1: Algorithm for process analysis on node with primary copy of data

Result: Attack Probability Score (APS) of a process
Set-up secure communication among replicas;
Load APS lookup tables <CFI, APS >;
while current instruction in APS lookup tables do
  | gel APS of current instruction from APS lookup
  | tables;
end
calculate attack probability using equation 2 ;
calculate APS of process using equation 1 ;
create packet with instruction & data stacks and APS;
encrypt packet with private key;
send packet to all replicas:
go to next process;

Algorithm 2 illustrates an example of an algorithm that may be implemented in the attack detection system 500 and is directed to confirming the attack after consensus with replicas and taking necessary recovery and prevention measures.

Algorithm 2

Algorithm 2: Algorithm for attack confirmation on replicas

Data: packet from replica node
Result: attack detection and recovery
packet is decrypted with public key;
instruction stack, data stack and APS are recovered;
if APS are same then
  if stack sizes are same then
    if instruction stack are same then
      if data stack are same then
        everything alright;
      else
        process data is modified;
      end
    else
      process instructions are modified;
    end
  else
    process is modified or not same;
  end
else
  process is attacked;
end Algorithm 1 is directed to a local algorithm for process analysis. This algorithm runs inside the security module as soon as the DOC 700 of a program is received. In some embodiments, the process analysis relates to checking the control flow instructions 704. However, in other embodiments, the process analysis can further relate to data access through sensitive registers, memory locations and/or other information. Depending on final APS value 810 of the process, an encrypted packet with process information is broadcasted to all replica data node 112. The overhead of running this algorithm is proportional to: (i) the number of running processes and (ii) the DOC size of each process. The size of the encrypted packages to be shared with replica nodes 112 is directly proportional to the number of control flow instructions 704 in the process they are associated to.

Algorithm 2 relates to the replica algorithm for attack confirmation. This algorithm runs inside the security module 504 as soon as a packet is received from replica 112. The idea behind this algorithm is to perform a simple comparison that runs at multiple levels for optimization. For example, if the size of the instruction stack received does not match the size of corresponding local instruction stack, then the algorithm confirms the attack without checking the contents of the stacks. Depending on result from this algorithm, either the process is evaluated as a safe program or necessary recovery actions are to be taken.

Experiments

In a big data system 502, the attack detection system 500 is local to the nodes 112 that are related by the data they host and independent to the job execution cycle. This makes it easy to setup the test environment because only a small subset of the cluster is required to test the end-to-end workflow the attack detection system 500 of the present disclosure. A Hadoop® cluster of three virtual nodes 112 was established to test the overhead due to the attack detection system 500 of the present disclosure. This three-virtual-node Hadoop® cluster represents a big data system 502 with replication factor of three (e.g., primary node 112*a* and two replica data nodes 112*b*, 112*c*). Table II shows the hardware and software configuration of a node in virtual Hadoop® cluster setup.

TABLE II

| Name | Value |
| --- | --- |
| Processor | AMD A8-6500 APU @ 3.49 GHz (1 Core) |
| Motherboard | Oracle VirtualBox v1.2 |
| Chipset | Intel 440FX-82441FX PMC |
| Memory | 3072 MB |
| Disk | 215 GB VBOX HDD |
| Graphics | InnoTek VirtualBox |
| Network | Intel 82540EM Gigabit |
| OS | CentOS 6.4 |
| Kernel | 2.6.32-358.el6.x$86_6$4(x$86_6$4) |
| Compiler | GCC 4.4.7 20120313 |
| File-System | Ext4 |
| System Layer | VirtualBox 4.2.16 |

The attack detection system 500*a* was tested against fourteen benchmark tests that represent memory, processor and system tests. These tests belong to the CPU and crypto suite from Phoronix Test Suite benchmarks.

Experiments were designed to first create a baseline using an existing big data system 502 and then check the overhead of using the attack detection system 500*a* of the present disclosure on the same system. First, a baseline was created by running the CPU and crypto benchmarks of Phoronix Test Suite on the cluster. The list of fourteen tests used to test the attack detection system, along with their metrics, results and characteristics are given in Table Ill. Columns execution, memory and % CPU together relate to the characteristics of baseline. The tests are listed in increasing order of code size. To emulate workflow of a big data system, these tests are run in sequence on the virtual cluster (e.g., first on the primary node and then on the replicas).

TABLE III

| | | Baseline | | | Proposed Framework | | | | |
|---|---|---|---|---|---|---|---|---|---|
| sno | Benchmark Test | Execution (seconds) | Memory (mb) | % CPU | % CFI | APS | Packet size (mb) | Analysis (seconds) | Confirmation (seconds) | % Overhead |
| 1 | Stream: copy scale triad add | 12 | 1023 | 40% | 5% | −0.89 | 0.004 | 0.01 | 0.01 | 0.001 |
| 2 | C-Ray | 322 | 1011 | 98% | 9% | −0.64 | 0.012 | 0.02 | 0.02 | 0.0001 |
| 3 | Smallpt | 740 | 665 | 99% | 5% | −0.89 | 0.017 | 0.01 | 0.03 | 0.00005 |
| 4 | Himeno Benchmark | 65 | 1029 | 89% | 8% | −0.68 | 0.026 | 0.02 | 0.02 | 0.0006 |
| 5 | Apache Benchmark | 172 | 1116 | 95% | 13% | −0.49 | 0.054 | 0.02 | 0.03 | 0.0002 |
| 6 | TSCP | 20 | 1026 | 35% | 14% | −0.48 | 0.079 | 0.02 | 0.02 | 0.002 |
| 7 | Parallel BZIP2 Compression | 39 | 946 | 85% | 13% | −0.5 | 0.20 | 0.16 | 0.04 | 0.003 |
| 8 | FLAC Audio Encoding | 14 | 729 | 75% | 14% | −0.48 | 0.42 | 0.22 | 0.03 | 0.01 |
| 9 | John The Ripper: Traditional DES Blowish | 67 70 | 1026 | 92% | 9% | −0.63 | 0.6 | 0.37 | 0.04 | 0.006 |
| 10 | LAME MP3 Encoding | 23 | 729 | 82% | 10% | −0.61 | 0.89 | 0.46 | 0.05 | 0.02 |
| 11 | Crulty | 124 | 670 | 94% | 7% | −0.76 | 1.35 | 1.06 | 0.07 | 0.009 |
| 12 | 7-Zip Compression | 40 | 1015 | 82% | 13% | −0.5 | 2.95 | 1.4 | 0.12 | 0.03 |
| 13 | GraphicsMagick: HWB color space Local Adaptive Thresholding Sharper: Resizing | 62 | 1028 | 89% | 12% | −0.53 | 4.88 | 2.54 | 0.18 | 0.04 |
| 14 | OpenSSL | 22 | 730 | 72% | 11% | −0.55 | 6.82 | 2.77 | 0.23 | 0.13 |
| | Average Values | 121 | 910 | 81% | 10% | −0.6 | 1.30 | 0.65 | 0.06 | 0.017 |

Assembly code of the fourteen benchmark tests was obtained by disassembling their executable files. These assembly files are then given as input to the attack detection system 500a for analysis and attack identification. For the experiment, the secure communication protocol used basic XOR for packet encryption and decryption. TCP was used for communication among the replicas. The framework considers all benchmark tests as potential threats and runs the algorithms on all of them. The lookup tables used to calculate APS used Table I on a predefined list of control flow instructions and APS values of each of these instructions was set to three. Control flow instructions used include Branch (bt, bts, btr, bswap), Jump (js, je, jne, jmp, jmpq, ja, jae, jb, jbe, jg, jge, jl, jle, jns, jp, jnp, jo, jno, jrcxz), and Other (call, ret C).

Results of each test in the baseline are given in Table III. These results are also uploaded to the openbenchmark website. The metrics and average result column are generated by the benchmark suite. It can be noticed that the crypto and CPU benchmark tests used in the experiments have varying CPU usage (e.g., between about 35% to about 99%). Also, the execution time of these tests varies from low (about twelve (12) seconds) to high (about 740 seconds). This variation in time and processing needs of the benchmarks is intentional because one of the important goals of the attack detection system is to be generic and hence cannot be tested on adhoc experiments. Columns of Table III starting from column % CFI characterize the overhead of using the attack detection system of the present disclosure. The % CFI column shows the significance of control flow instructions in a program. It can be noticed here that control flow instructions typically factor for 10% of the total instructions in a benchmark test. The APS column is derived from % CFI column. Each CFI was given an APS value of three (3) and Equations 1 and 2 were used to calculate the values. The next column (i.e., Packet size) shows the size of encrypted messages transferred in the network during the runtime of the attack detection system. This column indicates the network overhead of using the attack detection system 500 on top of a big data system. Since packets contain all information about control flow instructions in a program, their size is proportional to the previous column, % CFI in a benchmark test. One interesting learning from this result is to contemplate the idea of using the attack detection system at function level instead of process level to reduce the packet size. Time measurements are very important when estimating overhead in big data systems. Analysis and confirmation columns of Table III show time consumption of the attack detection system of the present disclosure for local process analysis and attack confirmation respectively.

Figure 10A:
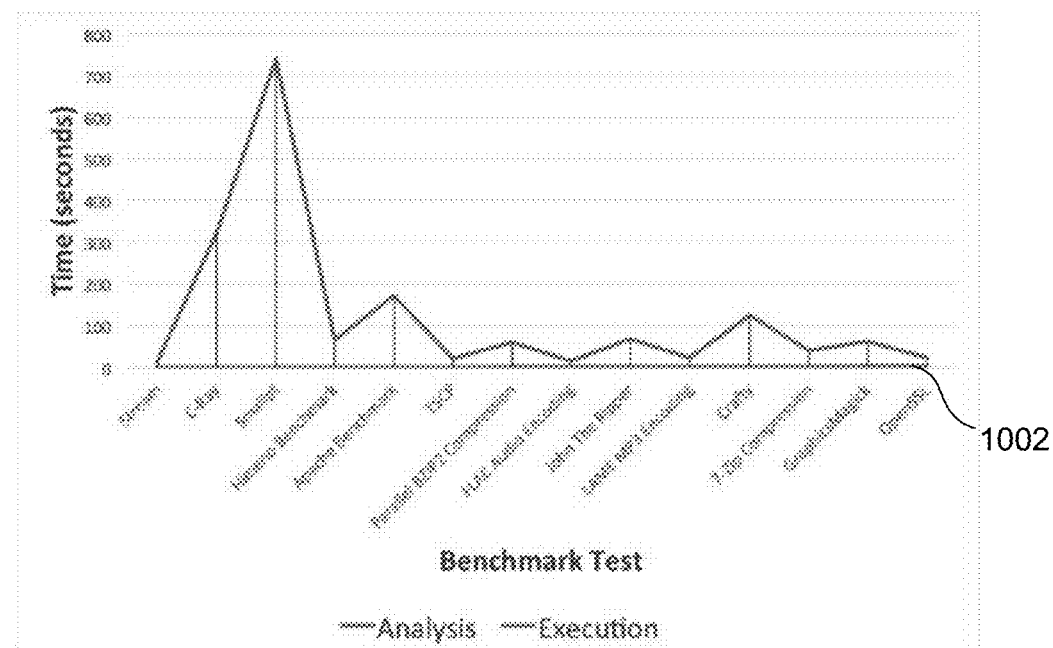
FIGS. 10A and 10B illustrate example graphical representations related to the time required to analyze a process, according to various embodiments of the present disclosure.
Figure 10B:
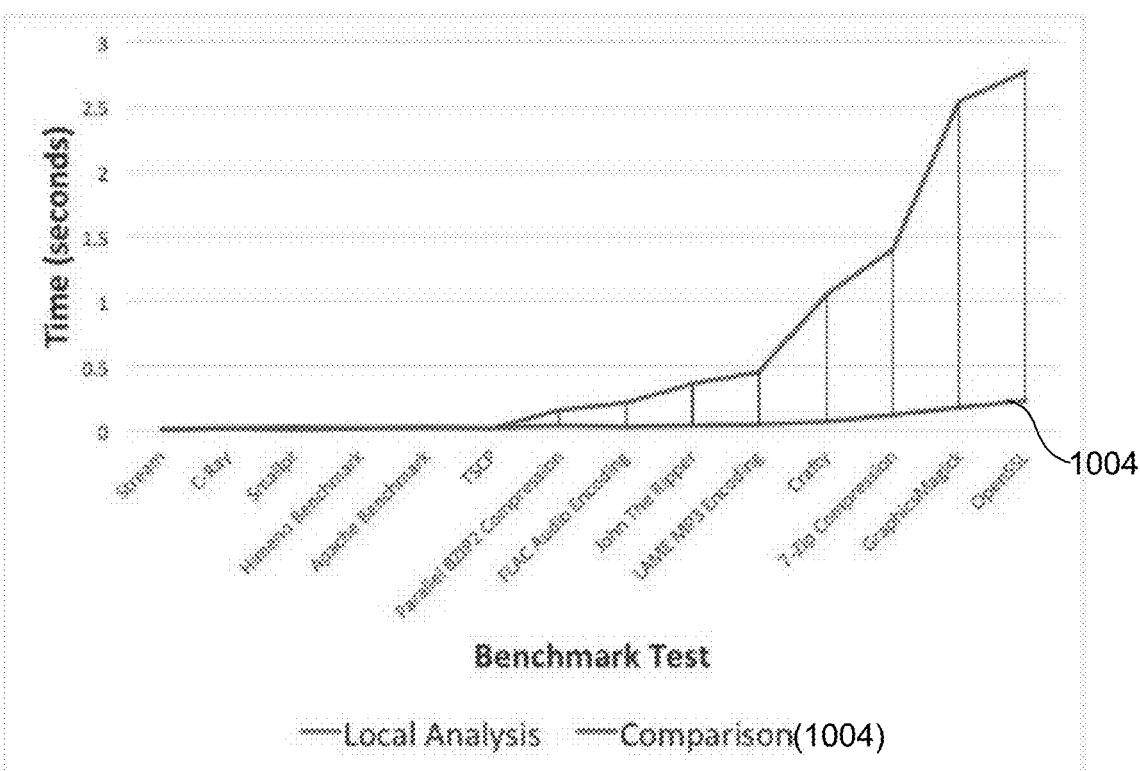

FIG. 10A illustrates that the time required to analyze a process DOC is negligible compared to execution time, which is represented by the horizontal line 1002 running along the x-axis. The time for network transfer is not included here because it depends on the transfer capacity of the network. The time required for replicas to confirm (or deny) an attack by comparing the packet information with local copy is marginally low when compared to its analysis counterpart. The same can be observed from the graph in FIG. 10B. The horizontal line 1004 running along the x-axis of FIG. 10B represents this. The main reason for such low values in confirmation time is because of multi-level decision making and using separate instruction and data stacks. But the most interesting observation from these tests is the time taken by the attack detection system 500a to determine whether a process is attacked or not. This is calculated by adding the values for analysis and confirmation; and dividing the result with the execution time. The average time taken by the attack detection system to detect an attack is 0.01% of the time required to complete the corresponding benchmark test. Also, on average, the attack detection system uses 85% of the central processing unit (CPU) for process analysis and 94% of the CPU for attack confirmation.

Example 2—Detection of Insider Attacks for Big Data Systems

Figure 11:
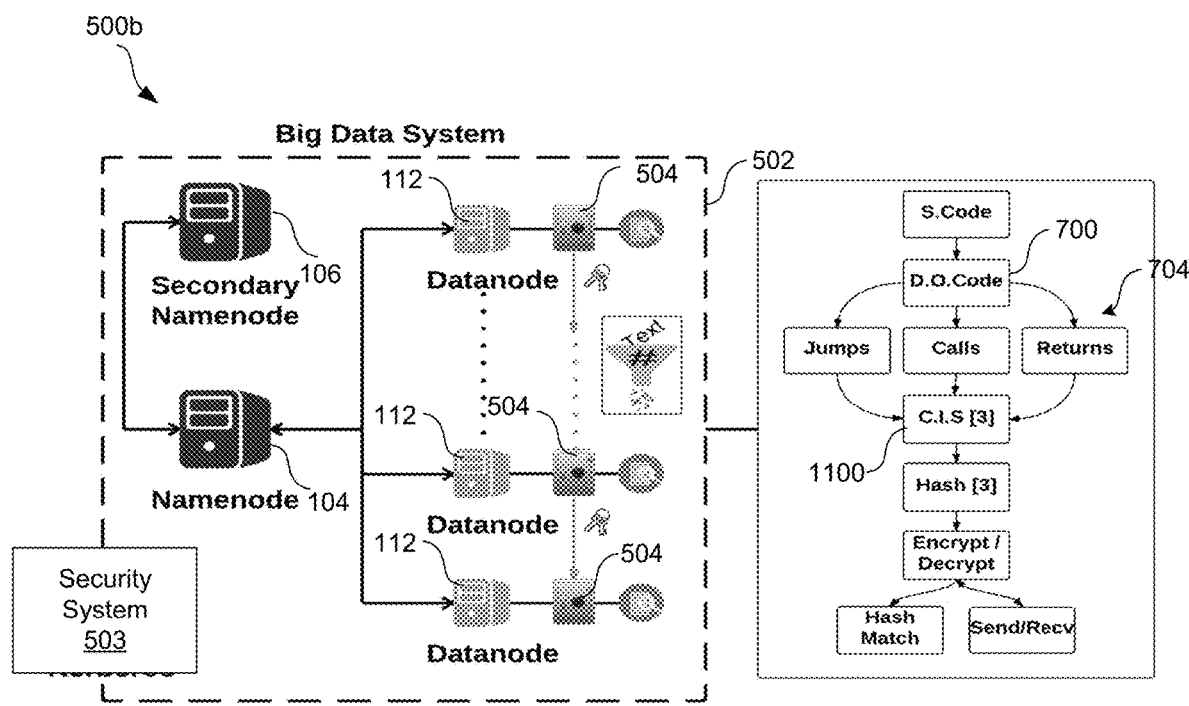
FIG. 11 illustrates a pictorial diagram of an example of the attack detection system of FIG. 5 implemented within a big data system according to various embodiments of the present disclosure.

The attack detection system 500 for attack detection in big data systems 502 can efficiently detect insider attacks according to various embodiments of the present disclosure. FIG. 11 illustrates a pictorial diagram of an example of an attack detection system 500b implemented within a big data system 502 according to various embodiments of the present disclosure.

The attack detection system 500b implemented according to FIG. 11 uses a two-step algorithm for attack detection. First, program profiling is performed by individual data nodes 112 of the big data cluster on the processes they execute. In this step, process binaries of scheduled processes are disassembled and analyzed to generate control instruction sequences (CIS) 1100. These control instruction sequences 1100 are then hashed, encrypted and shared among data nodes 112 that host the same data (i.e., primary and replica nodes). Next, consensus among data nodes 112 is achieved regarding the possibility of a process being attacked. This step involves two phases: hash matching and information sharing. Upon receiving encrypted messages from primary nodes 112, the replica data nodes 112 apply sequential, on-demand string matching between the locally generated hash and the received hash. Next, the result of this comparison is shared with the primary node 112. Depending on the results received, the primary data node 112 notifies the master node to take necessary recovery measures. All communications among data nodes 112 are performed using a secure communication protocol 812 of the attack detection system 500b that is based on public-private key encryption.

In this example, the attack detection system 500b is based in part on Control Flow Integrity (CFI), which is another popular and effective technique for attack prevention which enforces the execution of a program to follow a path that belongs to the program's control flow graph. The set of possible paths are determined ahead of time using static CFG. A coarse-grained or fine-grained version of CFI can be used for program profiling, but the problem with any such profiling techniques is the overhead incurred in conducting them, which increases if performed remotely. Though such limitations of this approach have been identified, it is accepted as a strong and stable security enforcing mechanism. There are a plethora of CFG-based code similarity algorithms. But such CFG similarity check methods are complex, expensive, and have no defined standards. Most CFG similarity algorithms rely on some simplification techniques such as fingerprints, edit distance, comparison only with known graphs in a database etc. Also, the impact of CFG similarity analysis differs a lot depending on when and how the CFG is generated for a program. These complexities and uncertainties led to a new set of control flow analysis techniques that avoid translating the program code to a formal model, such as, for example, insider attack detection based on symbolic execution and model-checking of assembly code.

In this example, the attack detection system 500b implements a control flow similarity check for attack detection that totally discards the idea of building CFGs. Instead, this example is based on simple string matching of control instruction sequences 1100 obtained from assembly code of scheduled processes. Insider attacks are a dangerous security problem in any domain because they are difficult to predict and detect. Hence organizations must try to safe guard their systems and data from insider attacks. Predictive models for user/program/network behavior with the help of continuous monitoring is a widely adopted solution for insider attack detection, but such a prediction is not completely reliable, and the difficulty in detecting attacks grows with the complexity of the underlying system. Recent advancements in computing led to wide adoption of services like cloud computing and big data, which are extremely complex in their design and development. In cloud computing, many insider attacks can be performed by misleading the client side services, and once compromised, data obtained can provide social engineering opportunities for cascade attacks. Having security as a service model for cloud environments and having sealed clouds are some ideas proposed towards protecting cloud infrastructures from insider attacks. While cloud computing is more about computing on the fly, big data deals with organizing and managing large sets of data. Insider attack detection and prevention for big data frameworks is an area that is not well explored yet.

Security in Big Data

Security in big data is gaining tremendous momentum in both research and industry, but big data security is overwhelmingly inclined towards leveraging big data's potential in providing security for other systems. Security within big data systems is still a budding phenomenon. It is ideal to include security as a major component in the holistic view of big data systems, but the requirements of big data applications like real-time data processing, fault tolerance, and continuous availability give little scope to employ complex and robust security mechanisms. All existing security techniques implemented within big data frameworks are software based and try to prevent external entities from attacking the system. For example, the main requirements in Hadoop® security design focus only on access control. Big data systems encourage software based fine-grained security mechanisms like Kerberos; access control lists (ACL); log monitoring etc. Big data security is inclined towards specifying multi-level access rights: user level, application level and data level. Advantages of having such simple software oriented security mechanisms, like Kerberos, are better performance and simple management. But there are various problems with such a policy enforcing security software. Also, none of these approaches can strongly counter insider attacks. According to Hadoop® Security Design, permissible performance overhead for a change in architecture is only 3%. This is precisely the reason behind coarse-grained security mechanisms like data encryption being an optional and restricted feature in big data systems. Data encryption in Hadoop® is only available for data that gets exchanged between user and the system, but not for data that travels within the system.

Also, big data properties such as large scale distributed infrastructures and replication make it difficult to detect insider attacks precisely using the traditional methods. In this example, the attack detection system demonstrates the inefficiency of existing big data security mechanisms by implementing two insider attacks on a big data cluster.

Manipulating Activity Logs

Figure 12A:
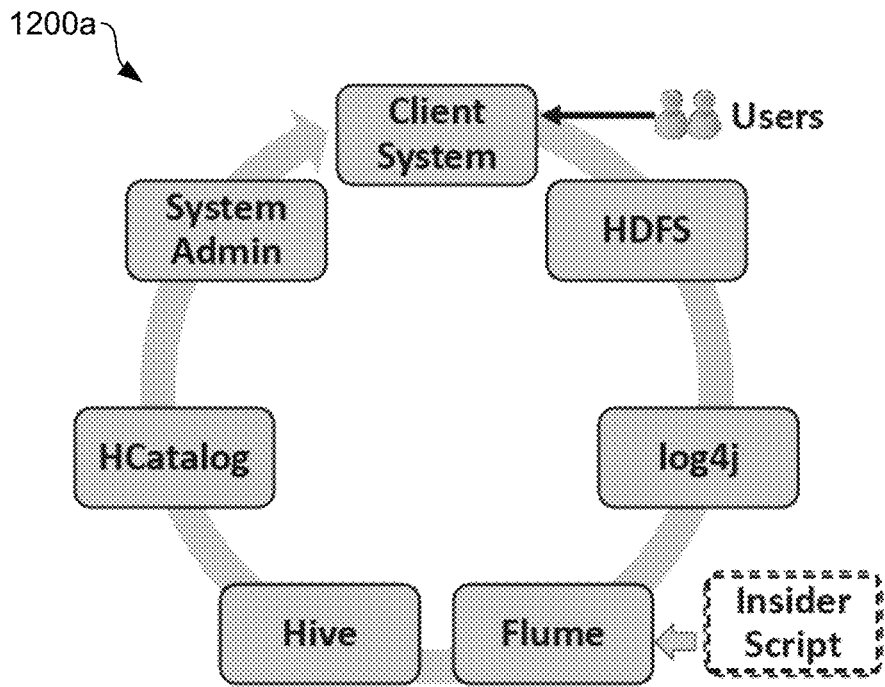
FIGS. 12A-12B illustrate examples of workflows that can be used to successfully implement an insider attack in a Hadoop® big data cluster.

The first attack 1200a, as shown in FIG. 12A, manipulates log data in order to produce erroneous results during log analysis. Flume and Kakfa are two popular big data products for real-time event processing. The framework of most big data analysis and security solutions tend to use Flume and Kakfa services. It is known that a system admin can able to detect distributed DOS attacks on the Hadoop® cluster by analyzing the server log data. However, the admin can also act as a traitor, manipulate the server log data, and create results that depict a false picture to the higher administration. As per the workflow in this example, users requests the client service to access data stored in HDFS. These user requests will all be logged by the log 4j service. Hence, any attacker requests will also be logged. The system admin can easily build a framework with the help of services like Flume, Hive and Hcatalog to monitor and track the user requests. A small script that filters the streaming data going from Flume to Hive can be induced by an insider to script the results according to the insider's choice.

Deleting Edit Log

Figure 12B:
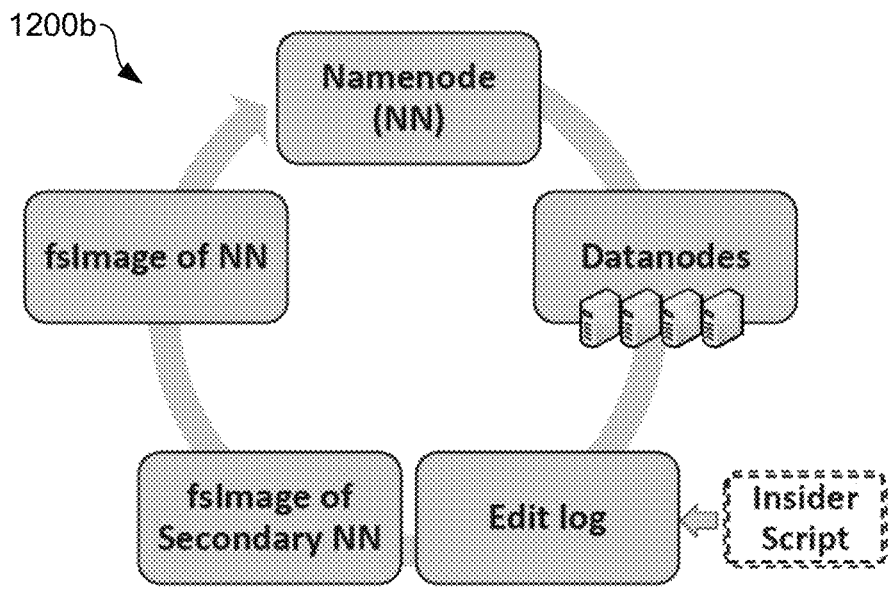

The second attack 1200b, as shown in FIG. 12B, deletes the contents of editlog such that user data gets deleted eventually. A system admin who has access to the secondary namenode 106 in a Hadoop® cluster can implement this attack. Namenode 104 is the focal point (and a single point of failure) of a HDFS file system. It stores the metadata of all files in HDFS along with their storage locations in a data blob called the fsImage. Editlogs, along with fsImage, are updated periodically such that the namenode 104 has access to up to date information about data stored in the Hadoop® cluster. To save time and computation energy on the namenode 104, this process is performed off-site on secondary namenode 106, sometimes called the checkpoint node and the output fsImage is directly dumped on to the namenode 104. Hence, manipulating edit log content will reflect, by the next checkpoint, on the fsImage which will be used by the namenode 104 for job allocation and scheduling. This is a weak point in the Hadoop® architecture that can be misused easily by insiders. FIG. 12B shows the workflow for checkpointing in a Hadoop® cluster and how an insider can introduce a script to delete user data forever. In the most extreme case, if an insider induces a small script that completely wipes out the editlog, the fsImage will be empty at the next checkpoint.

A known TPM based authentication protocol for Hadoop® claims to be much faster than Kerberos, though it has not been fully implemented. A hardware-oriented security method to create trusted Apache Hadoop Distributed File System (HDFS) was proposed, but was proven to work only on one node. The overhead of data encryption by TPM acts as a hindrance in adopting this method, especially when the size of data maintained in big data systems is ever growing. In this example, the attack detection system 500b is designed as an independent system.

Attack Model

It is assumed that the attackers are System Admins who have complete access ONLY to the software running on a big data cluster. They can manipulate existing whitelisted programs of the cluster but cannot create and run new programs. Also, it is assumed that replica nodes of the big data cluster are not managed by the same System Admin. This assumption is derived from real world example of how Amazon® manages replicas of data in its datacenters. Common programming languages for big data management are java, scala, python and R. This work is limited to big data frameworks that use JVM (Java virtual machine) for compiling and interpreting program code. Hence, input for all the proposed security methods is obtained from Hotspot VMs that convert bytecode to native code. Finally, the scope of attacks considered in this work is limited to insider attacks that manipulate control flow of processes by altering the control behavior as observed from native code.

System Architecture

Figure 13:
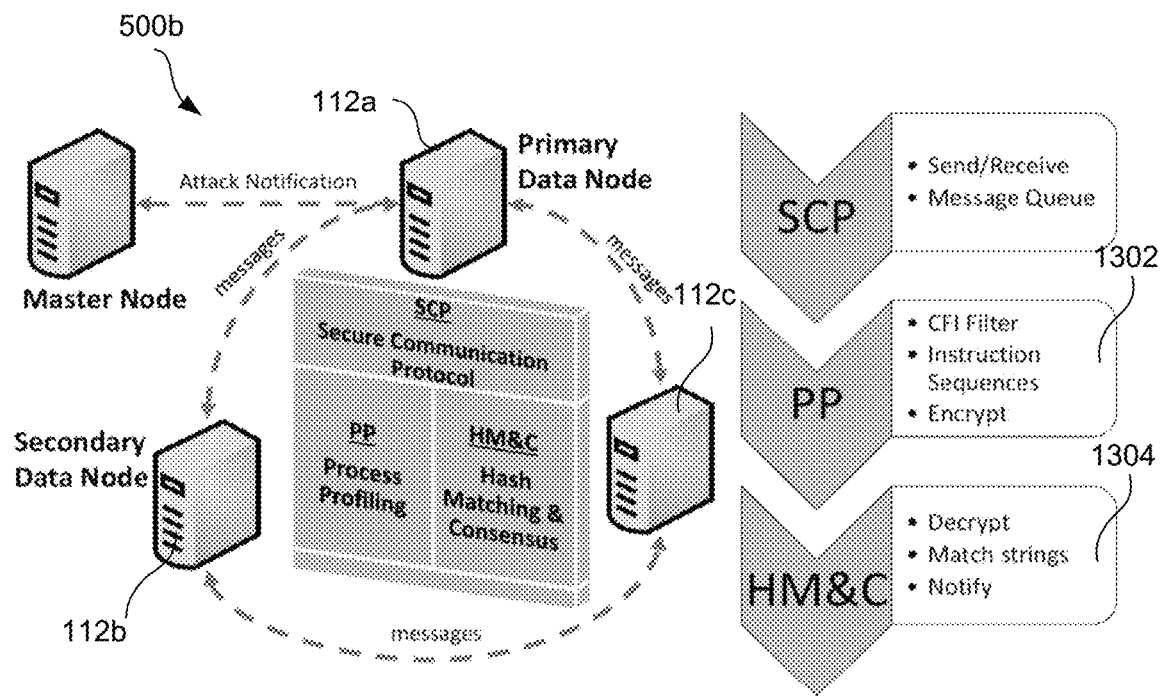
FIG. 13 illustrates a pictorial diagram of an example of the attack detection system that includes a secure communication protocol and a two-step attack detection algorithm according to various embodiments of the present disclosure.

FIG. 13 illustrates a pictorial diagram of an example of the attack detection system 500b that includes a secure communication protocol 812 and a two-step attack detection algorithm according to various embodiments of the present disclosure. The first step 1302 in the attack detection algorithm is process profiling, which is conducted locally and independently at each node to identify possible attacks. The next step 1304 includes hash matching and consensus, which is conducted by replica data nodes to conclude about the authenticity of a possible attack.

Secure Communication Protocol

A big data system 502 is technically a distributed data storage system that relies on secure and efficient communication protocols 812 for data transfer. The attack detection system 500 of the present disclosure aims to provide robust security for big data systems by having a modular design and being independent from the core big data services. For this reason, a separate secure communication protocol 812 is included in the attack detection system design that can be isolated from the set of default communication protocols used by the big data system 502. According to various embodiments, the attack detection system 500 comprises a mix of independent security modules 504 that work together and reside on individual data nodes 112 of the system. These security modules 504 use the secure communication protocol 812 to share packets of data with their counterparts on other nodes of the cluster. The data shared among the security modules 504 in the system architecture contain vital information about the analysis of a process. Hence, all data transferred by any data node 112 using this secure communication channel is encrypted upfront using private key encryption.

The associated public key will be shared with all other replica nodes that a data node needs to communicate with. Hardware security chips like TPM or Intel's TXT have public-private key encryption modules. Such hardware security chips come with a hardcoded, on-chip master key. A simple random number generator module is used to generate public-private key pairs periodically using the hardwired master key. Given the off chance of leakage of private keys, a key pair is held active for only a certain time period T. This increases the robustness of the communication protocol.

The public key of a node is shared with all other nodes it has to communicate with (i.e., replica nodes and master node). All incoming data packets to a node will be encrypted with its current public key and can only be decrypted using the corresponding private key that is stored locally. Decrypted information will be sent to the process matching module to identify attacks. Given the short lifespan of public keys used in the secure communication protocol of the present disclosure, each node should be able to store public keys of all other nodes it has to communicate with. Also, storing older keys of other nodes helps in verifying authenticity of nodes in case of attack recovery. Hence, according to various embodiments of the present disclosure, the queue data structures are used on every node to store the periodically generated public keys of other nodes. The back of $queue_n$ will be the latest public key to be used for encrypting packets to be sent to node n, while the front of $queue_n$ will be deleted when $queue_n$ is full (to accommodate a new key). Limiting the maximum queue size by some k will make sure that a node has enough information to support attack recovery measures while not consuming too much memory. It should be noted that a predefined value of three (3) for k was used while conducting the experiments. Algorithm 3 shows the steps involved in an example secure communication protocol 812 according to various embodiments of the present disclosure.

Algorithm 3
Algorithm Secure Communication Protocol

```
while true do
    if time = T then
        for all n ∈ OtherNodes do
            newkp_n ← get new public private key pair (TPM)
            pub_n ← get public key from newkp_n
            priv_n ← get private key from newkp_n
            node_n ← send(pub_n)
            arr_priv[n] ← priv_n
        end for
        for all n ∈ OtherNodes do
            if queue_n full then
                dequeue(queue_n)
            end if
            queue_n ← enqueue(pub_n)
            arr_pub[n] ← queue_n
        end for
    end if
end while
msg to be sent to all replicas
for all r ∈ Replicus do
    pub_r ← back(arr_pub[n])
    msg_e ← encrypt(msg,pub_r)
    send(msg_e)
end for
```

Once a model of the attack detection system 500 is installed, all nodes 112 can periodically generate public-private key pairs for as long as the system is in use. This is accomplished with the help of the hardwired key on the special purpose security chip and the random number generator module. At the end of every T time units, a new public-private key (newkp$_n$) is generated on a data node 112 for communicating with replica node n. The private key priv$_n$ of newkp$_n$ will be used for decrypting incoming data from node n and the public key pub$_n$ of newkp$_n$ will be shared with node n. For ease of access to keys during decryption, current private keys of all nodes are stored in an array arr$_{priv}$[ ]. Once a public key pubs is shared with node n, all incoming messages from node n will only be decrypted using the associated priv$_n$ for the next T time units. An array of queues, arr$_{pub}$[ ], is used to store public keys received from all other nodes. When a data node 112 has to send a message msg to replica nodes 112, the public key of that data node 112 is used to create an encrypted message msg$_e$.

Detection Algorithm

The attack detection system 500b implements a two-step process: process profiling (step 1) 1302 and consensus through hash matching (step 2) 1304.

Step 1: Process Profiling: Traditionally, vulnerability scanning is performed away from the source program's execution domain to guarantee isolation. Hence, the results of such scan must be communicated back to the program. But this leads to a cost versus isolation trade-off, depending on the remoteness of the location used to perform the vulnerability scan. In big data applications, the source program's execution is distributed across multiple nodes of the cluster. This makes it difficult to implement techniques such as vulnerability scans on big data systems. But big data infrastructures use replication of data for high availability. This enforces the same program to be run on multiple nodes that host the data required for the program. The attack detection system 500b of the present disclosure exploits the unique property of big data systems 502 and introduces a variation of CFI to create a novel process profiling technique that can help in detecting insider attacks in big data systems 502.

It is known that CFI, either with limited number of tags or unlimited number of tags, is not completely effective in attack prevention. Also, CFI is usually based on CFG created from static analysis of program code. Most big data applications are packaged as jars that run on Java Virtual Machines (JVM). These jars are not completely compiled and do not convey much about the program they represent. Hence, the attack detection system 500b of the present disclosure does not use CFI on CFG's created using statistical code analysis.

In various embodiments of the present disclosure, the security module 504 is configured to build the control structure of a program from its corresponding JVM output (i.e., the assembly code of the Hotspot VM that hosts the JVM). Since this is considered the final run-time code that gets executed on the hardware, the control structure generated from the output of Hotspot VM is expected to be less susceptible to software attacks compared to a CFG generated from statistical analysis of program code. Another major variation from CFI in the disclosed process profiling technique is to use individual control flow instruction sequences instead of CFG paths. Control instructions dictate the control flow in a program. Generating instruction sequences of such control flow instructions from the assembly code output of hotspot VM should technically give us all information a CFG can provide in this context and avoid the complexity involved in generating a CFG.

An analyzer module of the security module 504 creates instruction sequences for jumps, calls and returns from the JVM output of a given program (based on Intel's Instruction Set Architecture), according to various embodiments of the present disclosure. Then, the SHA cryptographic hash function module is used to generate a fixed-length output for each of the three instruction sequences. All three hashes are combined and again given to the SHA cryptographic hash function module to generate a final hash for the program. This hash of hashes strengthens the uniqueness in identifying a program. All programs that run on every node 112 in the cluster will follow the same routine. Encryption module of the node with the primary copy of data uses currently active public keys of replica nodes 112 to encrypt the hash of hashes and send it to the associated replica node. Hence, this node 112 acts as the coordinator for performing the next step in the attack detection algorithm.

Algorithm 4 shows the steps involved in the process profiling 1302 implemented by the security module(s) 504. This algorithm will be running independently in the analyzer module of all machines in the big data cluster.

Algorithm 4
Algorithm Process Profiling

```
while true do
    proc_new ← get newly scheduled process
    code ← get assembly code from HotSpotVM(proc_new)
    for all instr ∈ code do
        if instr ∈ jump then
            seq_jump ← add instr to sequence of jumps
        end if
        if instr ∈ call then
            seq_call ← add instr to sequence of calls
        end if
        if instr ∈ return then
            seq_return ← add instr to sequence of returns
        end if
    end for
    seq_array ← add seq_jump
    seq_array ← add seq_call
    seq_array ← add seq_return
```

-continued

Algorithm 4
Algorithm Process Profiling

```
for all seq ∈ seq_array do
    hash_seq ← get hash from sha(seq)
    hash_hashes ← add hash_seq
end for
msg ← get hash from sha(hash_hashes)
send msg using Secure Communication Protocol
end while
```

Every process output, $proc_{new}$, from the HotSpot VM is grabbed by the analyzer module and profiled based on the control flow instructions present in its assembly code. Line by line analysis of $pub_n$ is conducted and each instruction instr is matched with the set of control flow instructions available in the instruction set of the processor architecture. In this example, the most prominent control flow instructions of Intel's x86 architecture (i.e., jumps, calls and returns) were used. When an instr in the code of the $pub_n$ is a control flow instruction, it gets added to the corresponding sequence string. The $seq_{array}$ represents the array of individual control flow instruction sequences in the process $pub_n$. This array is used later as input while generating the hashes for each control sequence string. All fixed length hash outputs are combined as $hash_{hashes}$ and rehashed to generate a final hash called msg that represents the program. This msg is then shared with all replicas running the same program using the secure communication protocol of the present disclosure.

Step 2: Hash Matching and Consensus The second step in the attack detection algorithm of the attack detection system 500b is a consensus algorithm 1304. In this step, the node 112 with the primary copy of data acts as coordinator and requests all replica nodes 112 that act as workers to confirm if their local hash of hashes (msg) of a particular process matches exactly with the coordinator's version. The coordinator then decides on the safety of the process depending on the acknowledgments received from participating replica nodes 112. A process is considered to be safe by the coordinator if and only if it receives safe acknowledgments from all of the workers. At the end of process profiling step 1302, encrypted message $msg_e$ is shared by coordinator node 112 with all worker nodes 112. The nodes 112 that receive such messages will decrypt the message with their currently active private key. The decrypted message is essentially the hash of hashes of the three control instruction sequence strings. This decrypted hash of hashes can be directly compared to the local version of the same process to detect the possibility of an attack. If the result of such comparison of strings is a perfect match, then that indicates that the same process (with the same code) was run on both nodes 112. This indicates a safe process unless both nodes 112 of the cluster are attacked the same way, in which case it will be a false positive.

A confirmation message about the result of the hash comparison will be sent to the coordinator node 112 as response to the original incoming message. The coordinator node 112 will wait to receive responses from all replicas in order to arrive at a conclusion about the possibility of an attack in a process. The given big data system 502 is safe as long as all the replicas respond with a safe confirmation. A single unsafe response will mean that the system is under attack. Algorithms 5 and 6 give more details about the hash matching and consensus steps that take place in this step of the attack detection algorithm.

Algorithm 5
Algorithm Hash Matching

```
while true do
    msg_p ← get message about process p from main copy
    hash_hashes(received_p) ← decrypt(msg_new, priv_k)
    hash_hashes(local_p) ← process - profile(p)
    if hash_hashes(received_p) ∈ hash_hashes(local_p) then
        confirmation ← safe
    else
        confirmation ← unsafe
    end if
    send(confirmation, main)
end while
```

Algorithm 6
Algorithm Consensus

```
for all node ∈ replicas do
    confirmation_node ← get confirmation about process p
        from replica
    if confirmation_node ∈ safe then
        count_safe ← count_safe + 1
    end if
end for
if count_safe ∈ count_replicas then
    attack ← no
else
    attack ← yes
    master_node ← recovery(p)
end if
```

Figure 14:
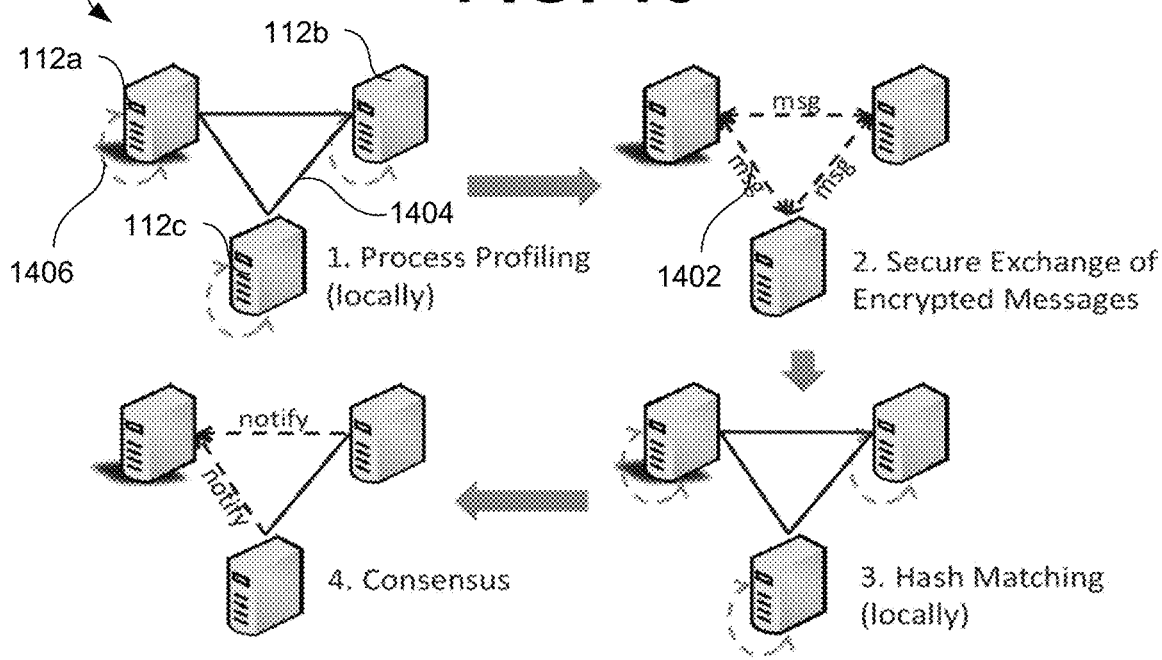
FIG. 14 illustrates a pictorial representation involved in the two-step attack detection algorithm of the attack detection system according to various embodiments of the present disclosure.

A pictorial representation of the steps involved in the two-step attack detection algorithm is given in FIG. 14. This figure represents a big data system 502 with a replication factor of three (3) and hence there is one coordinator (represented with a dark black shadow below the node) and two workers. Active communication channels 1402a are represented using a dotted line while the regular lines between nodes 200 represent passive communication channel 1404. The dotted loop around each node in step 1 and 3 of FIG. 14 represent local computations 1406.

Algorithm 5 is used in the hash matching step of the attack detection algorithm. When a worker node $node_k$ receives $msg_p$ from the coordinator node about a process p, it will decrypt that message using its current private key, $priv_k$ and stores the result as $hash_{hashes}(received_p)$. The local version of the same string, i.e. $hash_{hashes}(local_p)$, will be compared against the $hash_{hashes}(received_p)$ to identify similarity between local and received hash of a process. The result of this hash matching is sent back as confirmation to the coordinator node, main. The value of confirmation is safe in case of a perfect match of hashes and unsafe otherwise.

Algorithm 6 is used by the coordinator node 112a to identify an attack, with the help of worker nodes 112b, 112c. After the process profiling, the coordinator node waits for responses from all the recipients. The worker nodes respond with a confirmation message that says whether the process is safe or unsafe. If the count of number of safe responses (i.e., $count_{safe}$ from worker nodes matches with the count of number of nodes in the replica set i.e. $count_{replicas}$, the coordinator node assumes that there is no attack in the current process p and resets the attack variable. If a mismatch in the process analysis is observed, the attack variable is set and the master node is notified about the possibility of an attack in process p.

System Architecture

Figure 15:
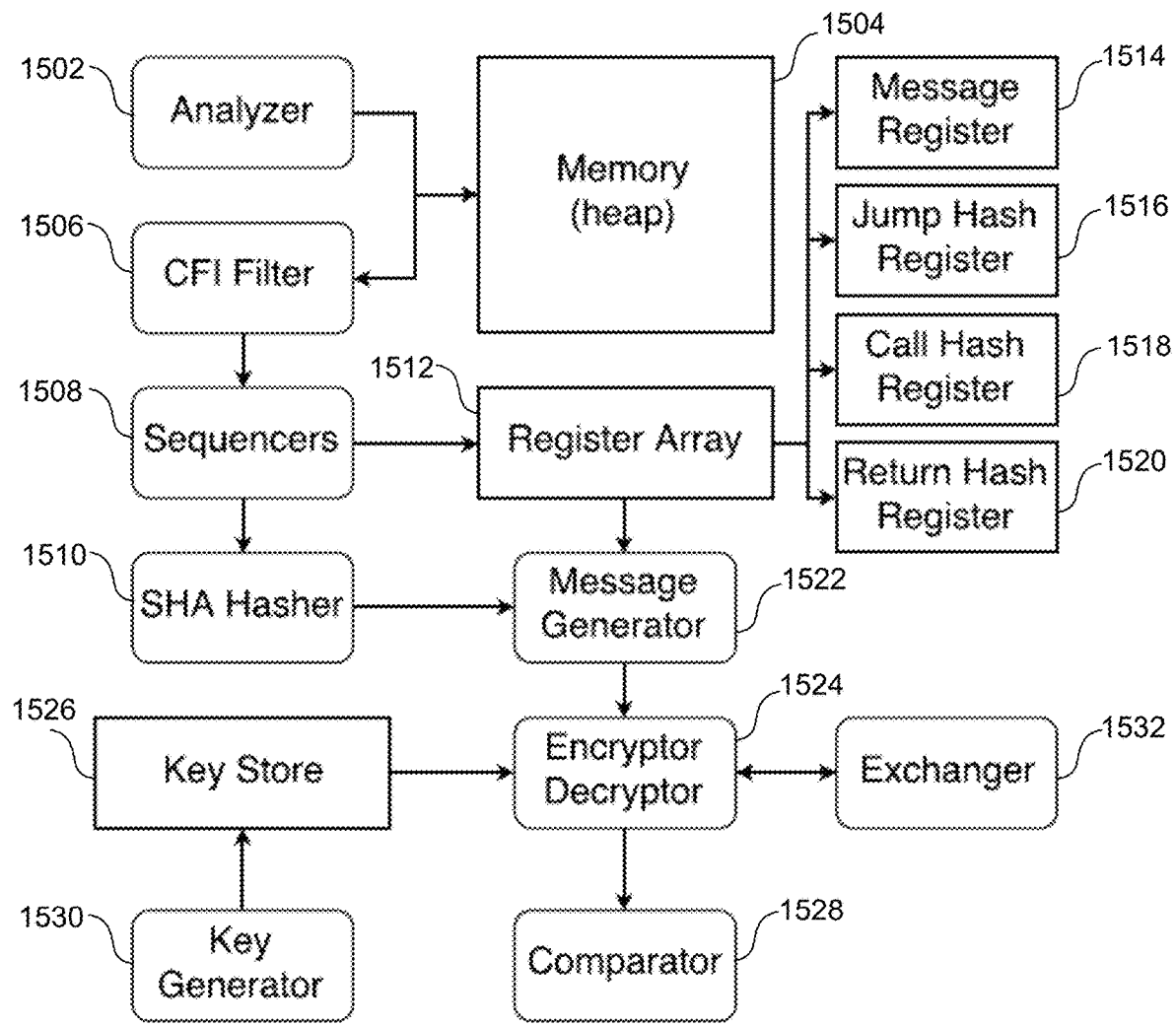
FIG. 15 illustrates an overview of the element of the security module of the attack detection system according to various embodiments of the present disclosure.

According to some embodiments of the present disclosure, the attack detection system is a combination of three parts: (1) secure communication protocol, (2) process profiling, and (3) hash matching. As shown in FIG. 13, these three parts are made of multiple modules 504 that need to be installed on all nodes 112 in the big data system 502. Also, locality of these modules 504 impacts the performance of the system greatly. The closer they are to the main processor of a node 112, the faster and less expensive it will be to communicate. But from a security standpoint, these security modules 504 need to be isolated from the big data system main workflow. The attack detection system 500 comprises the security modules 504 which include isolated special purpose security hardware chips. Such chips can be built on top of existing security hardware like TPM or Intel's TXT chips. An overview of the elements in such a security module 504 of the attack detection system 500 is given in FIG. 15. The analyzer module 1502 will get the data from the hotspot VM and perform the initial steps of cleaning the data. Results from the analyzer module 1502 are stored in memory 1504. The CFI filter module 1506 takes input, a set of assembly language instructions, from the analyzer module 1502 (technically, the memory module 1504) and filters out the control flow instructions 704 while maintaining the order. The sequencers module 1508 comprises three sequencers: one each for jumps, calls and returns. Each sequencer goes through the output of CFI filter module 1506 and forms a delimited sequence string of the instruction it is associated with. Then, the sequencer 1508 uses the SHA hasher module 1510 to generate and store a fixed length hash output from the variable length instruction sequence string. The register array 1512 comprises four registers to store message 1514, jump instruction hash 1516, call instruction hash 1518, and return instruction hash 1520. The message register 1514 is a special register in the register array 1512 used to store the message in a threadsafe manner. The message generator module 1522 combines all the individual hash outputs stored in registers and uses the SHA hasher module 1510 to generate a fixed length hash output. This hash of hashes is combined with the process metadata to generate and store a message that represents the process. The encryptor/decryptor module 1524 uses the key store 1526 to access the current set of public/private keys and the message register 1514 to access the current process message. The encryptor module 1524 uses the public key of a replica node from the key store 1526 and encrypts the message in message register 1514. The decryptor module 1524 uses the private key of the node from the key store 1526 to decrypt an incoming message. The comparator module 1528 performs string comparison between local message (hash of hashes) and received message. The key generator module 1530 uses the underlying in-built functionality of the TPM/TXT chip, or similar circuitry. The hardwired key and the random number generator of the security chip are used to generate a new public/private key pair; and the timer of the chip to trigger this action periodically. The key store module 1526 uses an array of memory locations to store the public key queues of all replica nodes and the current public/private key pair of this node. The three most recent public keys of each replica node is stored in its queue. The exchanger module 1532 uses TCP/IP protocol to exchange messages with other nodes.

Experiments and Results

The Hadoop® security design specifies that an about 3% slowdown in performance is permissible for any newly proposed security solutions. Hence, it is important for the attack detection system 500 to offer both theoretical correctness and feasibility in practical implementation and usage. Security in big data systems 502 is a new area that does not have set standards and specifically designed open-source benchmarks to evaluate the overhead. Hence, a set of general big data benchmark programs that are relevant and provided by the big data community were used to test the efficiency of the attack detection system 500 of the present disclosure.

Setup The three big data services used for the experiments were: (1) Hadoop®, the most popular implementation of a big data framework that is maintained by the Apache open-source community, which allows storing and processing of large date using programming models like MapReduce; (2) Spark, a fast and general engine for large-scale data processing that is supposedly much faster than Hadoop® and it is maintained by the Apache open source community as well; and (3) Amazon web services (AWS), a perfect example of real-world big data system. AWS provides Elastic Cloud Compute (EC2) service that allows users to use Amazon cloud's compute capacity depending on their needs. EC2 presents a true virtual computing environment. Storage for the EC2 nodes is provided by Amazon Elastic Block Store (EBS) which offers persistent storage. EBS volumes are automatically replicated to protect user from component failure, offering high availability and durability. The AWS supported Hadoop® and spark clusters were used for conducting the experiments. The Hadoop® cluster that was used is a five node cluster built using basic t2.micro nodes of Amazon EC2 and EBS. Each node is equipped with only 1 vCPU and 1 GB memory. The network performance is minimal for this cluster. The spark cluster used in experiments is a four node cluster built using general purpose m1.large nodes of Amazon EC2 and EBS. Each node is equipped with two vCPU and 7.5 GB memory. Network performance is moderate for this cluster. The hardware and software configurations of the EC2 nodes can be found in Table IV.

TABLE IV

| Attribute | Value | |
| --- | --- | --- |
| Instance Model | t2.micro | m1.large |
| Processor | Intel Xeon with Turbo | Intel Xeon E5-2650 |
| Compute Units | 1 (Burstable) | 4 |
| vCPU | 1 | 3 |
| Memory (GB) | 1 | 7.5 |
| Storage (SSD) | Elastic Block Store | Elastic Block Store |
| Networking Performance | low | moderate |
| Operating System | Linux/UNLX | Linux/UNIX |
| Hadoop distribution | 2.7.1 | 2.7.1 |
| Spark distribution | N/A | 1.6 |

A 64-bit Ubuntu AMI (Amazon Machine Instance) was built for each node-type before setting up the clusters. These AMIs were equipped with the latest distributions of Hadoop®, spark and gcc along with the code base. The Hadoop® cluster had five (5) nodes, where one (1) node acted as the namenode 104, one (1) node acted as the secondary namenode 106 and three (3) nodes were acting as data nodes 112. The spark cluster had a master and three (3) slave nodes. Since the attack detection system 500 works independently, all security modules 504 of the model had to be installed on every node of the EC2 clusters. A library of all modules in the model was implemented in C++ programming language using STL and multi-threading libraries and packaged together. The code used TCP/IP protocol and SSH keys for communication between the nodes of the clusters.

Though the main requirement for any attack detection system 500 is to be able to detect an attack successfully, being able to detect the attack before the attacked program completes execution is also a necessity. The efficiency and the overhead of the attack detection system is illustrated conducting the experiments in real-time using popular examples and tests.

Two sets of open-source big data benchmark programs were used in the experiments: (a) 16 Hadoop MapReduce Examples that are provided in the Apache Hadoop installation kit, and (b) 16 Sparkperf MLlib Tests for machine learning algorithms given in the spark performance test suite by Databricks. The input to the model (built from the attack detection system) is the run-time assembly code of a program. The Hadoop MapReduce examples were coded in Java and the Spark-pert MLlib tests were coded in Scala. So, the jars to run these examples were built using just-in-time compiling. Their bytecodes are insufficient to create the assembly codes of the individual programs. A software called jit-watch was used to generate the assembly codes (Intel x86 specification) of the programs from the jars. Since the attack detection algorithm of the present disclosure only needs control-flow instructions from the generated assembly code outputs of each program, a custom parser that can filter out control flow instructions from the native files was used. The command used for generating assembly code output of JVM (or Hotspot VM) when running the program is given as follows: $: java-XX:+UnlockDiagnosticVMOptions-XX:+PrintAssembly XX:PrintAssemblyOptions=intel-XX:+TraceClassLoading-XX:+LogCompilation-XX:LogFile=<filename>-cp<additional-classes-required><main-method-of-driver><args>.

First, the execution times for the Hadoop MapReduce examples on the Hadoop® cluster were calculated. Then the run times of the implemented model were studied while it was analyzing the assembly codes of the driver programs of the same examples. These experiments are adhoc because the input arguments for some of the experiments were intentionally low to simulate worst case scenarios where the process takes very less time to execute. To meet the input data requirements of the MapReduce examples, the config file data from etc folder of Hadoop® was put into HDFS. The generic command used to run these MapReduce examples is given as follows: $: time hadoop jar/share/hadoop/mapreduce/hadoopmapreduce-examples-2.7.1jar<main-method-of-driver><args>.

The spark-pert MLlib tests on the spark cluster were conducted the same way the mapreduce examples were tested, but here the inputs for the tests were predetermined by the benchmark provider in the config.py script. The generic command used to run these MLlib tests is given below: $:/bin/spark-submit-class mllib.perf.TestRunner-master<master-node-p>-driver-memory<mem-cap> mllib-perf-tests-assembly.jar<algorithm><args>.

Results and Analysis

The experiments used for evaluating the attack detection system comprised of stress tests and performance benchmarks of Hadoop® and spark. Hence, knowing which threads of investigation to follow and which to ignore was difficult and challenging. The focus of the experiments were on the execution time and code size. The overhead in the experiments was calculated from time measurements. The time taken was divided to detect an attack in a process p by the execution time of the same process and multiplied the result by one hundred (100) to find the percentage of time overhead, as given in Equation 3.

$$\% \ Overhead_p = \frac{\text{Time-to-Detect}(p)}{\text{Time-to-Execute}(p)} \times 100 \quad (3)$$

Figure 16A:
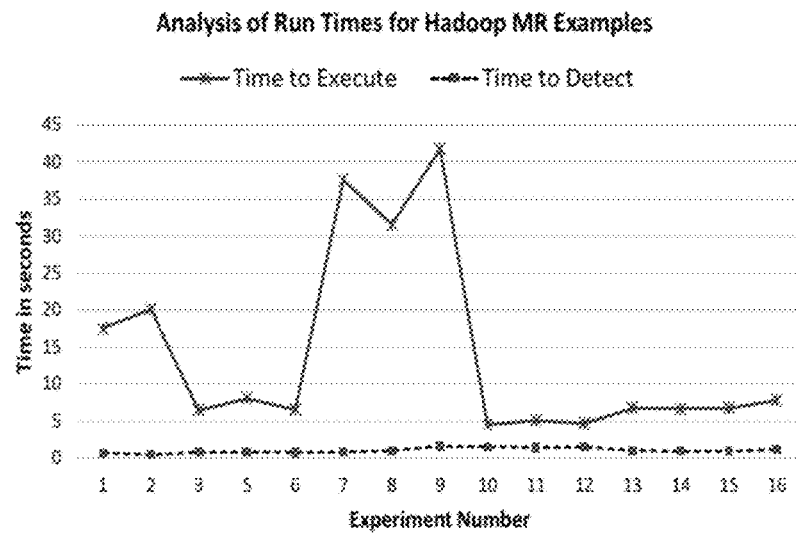
FIGS. 16A and 16B illustrate graphical representations of run time analysis of the attack detection system according to various embodiments of the present disclosure.
Figure 16B:
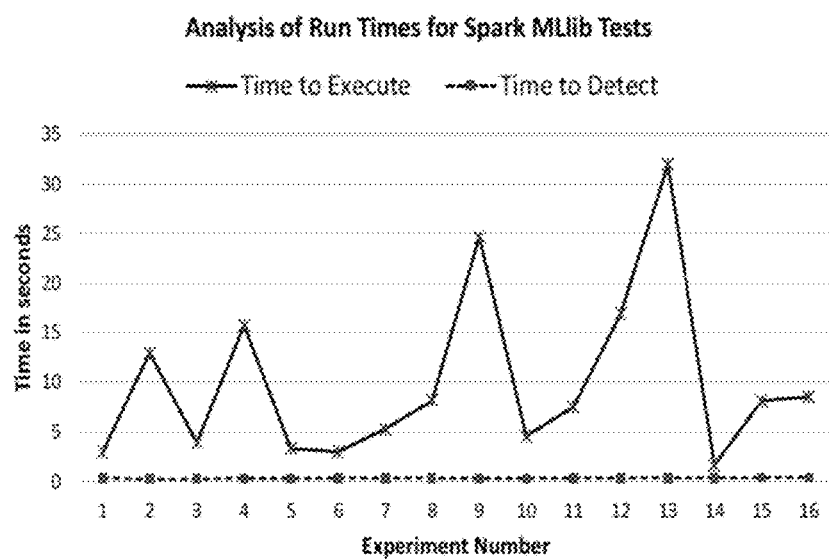

The overhead calculations show the worst case scenario since the input arguments are intentionally low for some of the experiments. FIGS. 16A and 16B show the analysis of run-times for executing the experiments and the model built from the attack detection system. On average, the overhead of running the model was 3.28%. The time taken to execute example number four (i.e., distributed bbp program) of the Hadoop® mapreduce example set was too high (288 seconds) to plot on the graph shown in FIG. 16A.

The attack detection system 500 performs a similarity check of control flow within duplicate processes running on different nodes of a big data cluster. This control flow similarity check is performed by matching control instruction sequences. To understand the efficiency of the attack detection system 500, the programs used in the experiments section (i.e., Hadoop® mapreduce examples and the spark performance tests for machine learning algorithms) should be better understood from a control flow perspective.

Figure 17A:
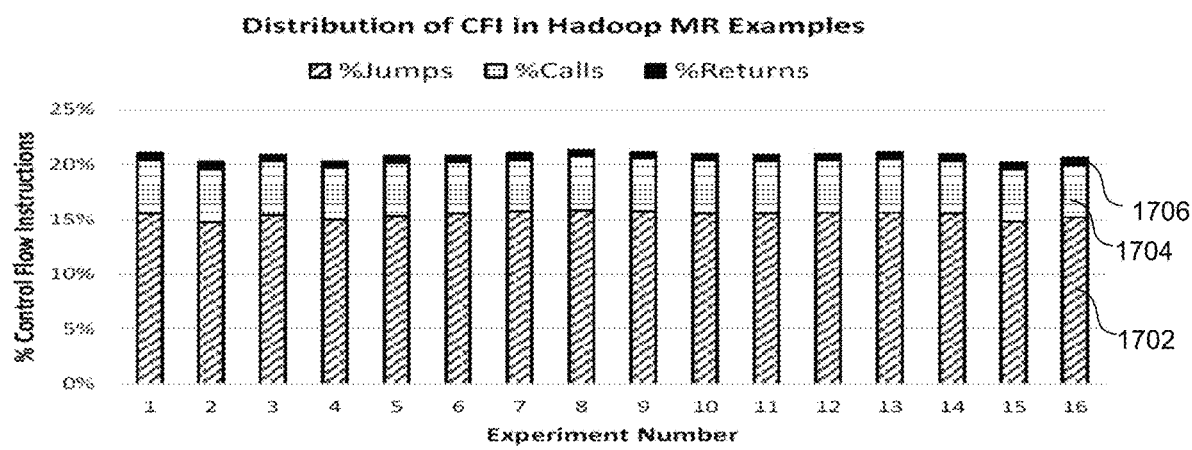
FIGS. 17A-17B show graphical representations illustrating instruction level properties of the examples and tests used in the experiments of the attack detection system according to various embodiments of the present disclosure.
Figure 17B:
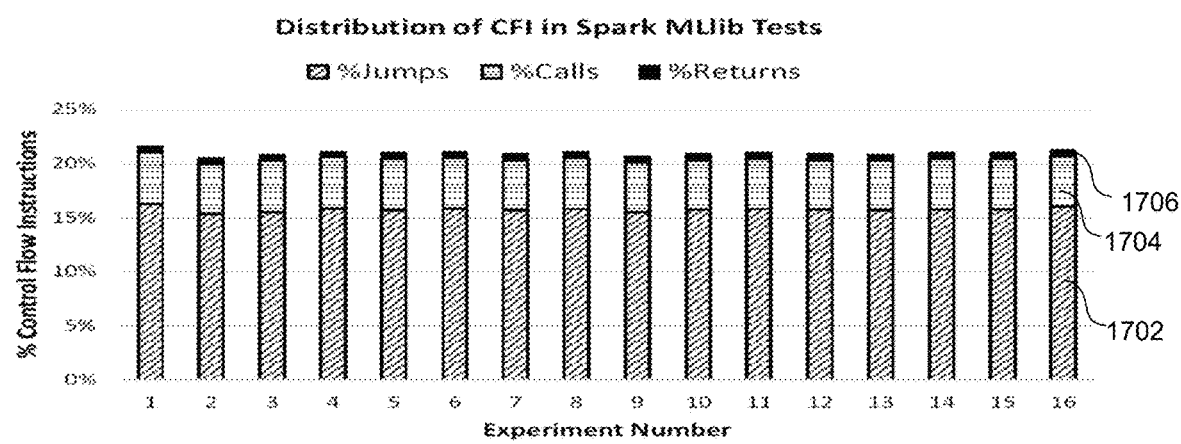

FIGS. 17A-17B show graphical representations illustrating instruction level properties of the examples and tests used in the experiments. It can be observed that only 20.8% of the total instruction count in the Hadoop® MapReduce examples account for control flow instructions. In case of spark performance tests for machine learning algorithms, 20.9% of instructions in the assembly code are control flow instructions. Of all control flow instructions, jumps 1702 are the most significantly used CFI with a lion share of 15.45% of the total instruction count in Hadoop® MapReduce examples and 15.74% of the total instruction count in spark performance tests. Calls 1704 and returns 1706 cover only 4.8% and 0.5% respectively in the Hadoop® MapReduce example set and; 4.6% and 0.5% respectively in the spark performance tests set.

From these results, that control flow instructions 704 are shown to account for only one-fifth of the total instruction count for a program (assembly code). This is a remarkable coincidence among these two sets of programs because (a) they are completely different in their domains—MapReduce on Hadoop®, machine learning in spark; (b) their source programming language is different—java for Hadoop® MapReduce examples, scala for spark-perf machine learning tests; and (c) they differ in program size—eight-six thousand instructions on average per program for the MapReduce example set and one-hundred and eighty thousand instructions on average per program for the spark perf machine learning tests. This observation about the similarity in distribution of control flow instructions in programs strengthens the argument that generating dynamic CFG for large and complex big data programs is cumbersome. This is because the size of CFG is proportional to the code lines which is related to the number of instructions.

Hence, generating CIS and hashing them is a good alternative to the CFG memory complexity problem. A false positive occurs when all data nodes are attacked in the same way which is relatively improbable. To summarize, some important observations from the results of the experiments are: (1) the overhead incurred in using the model built from the proposed system architecture is less than 3.28% if it is hosted by the same hardware that hosts the big data systems; (2) the time the attack detection system takes to analyze the programs and compare the results is linearly dependent on the number of control flow instructions in the program, but not on the number of lines of assembly code, which greatly reduces the complexity of the similarity analysis from the conventional and complex approach of generating a CFG; (3) generating CIS only needs a one-time parse through the program code (assembly code) and can be performed independently and in parallel on each node of the cluster; and (4) the experimental results show the feasibility of implementing a model of the attack detection system.

Figure 18:
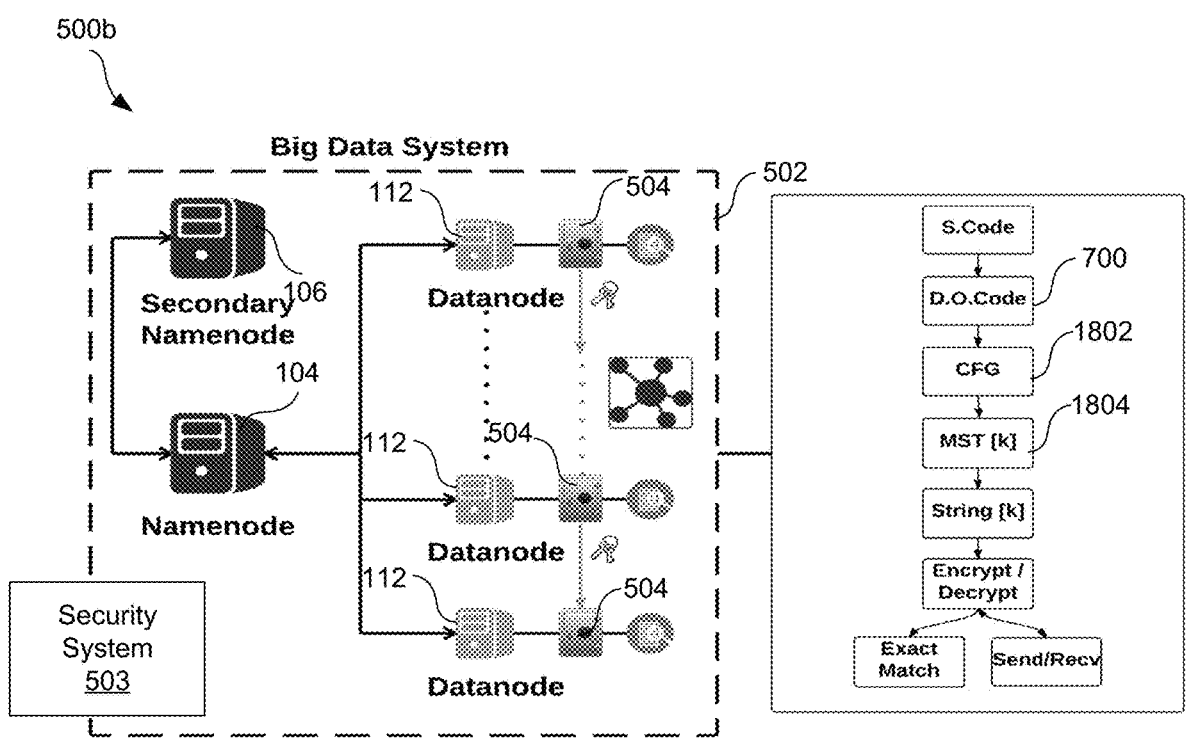
FIG. 18 illustrates a pictorial diagram of an example of the attack detection system implemented within a big data system according to various embodiments of the present disclosure.

Example 3—Control-Flow Based Instruction Detection Technique for Big Data Systems In some embodiments, the security system of the present disclosure detects attacks to big data systems via a control-flow based intrusion detection technique. FIG. 18 illustrates a pictorial diagram of an example of the attack detection system 500c implemented within a big data system 502 according to various embodiments of the present disclosure.

Typical intrusion detection systems (IDS) can identify malicious use based on their knowledge of possible threats or by learning from the behavior of programs. Knowledge-based IDS usually search a program for known threat signatures that are stored in a database. With new and zero-day attacks emerging regularly, it is impractical to have a pre-populated database of all possible threats. Even if it is assumed to have such a database, maintaining it would require a lot of resources and running search queries against it would be expensive. Behavior-based IDS try to model, analyze and compare application behavior to identify anomalies. This technique needs more resources and is more complex than signature-based IDS. However, the behavior-based IDS is more effective in a dynamically changing threat environment. Behavior based IDS generally use statistics and rules to detect anomalies.

In today's internet age, a distributed implementation of IDS is needed for which aggregation, communication and cooperation are key factors of success. Distributed IDS can provide centralized control and detect behavioral patterns even in large networks. However, distributed IDS has to be employed at multiple levels: host, network and data. Hence, using big data in general purpose distributed IDS implementations is recommended for faster processing. IDS within a big data system favors anomaly-based IDS when compared to knowledge-based IDS because of the naturally large and ever increasing scope of threats.

Using control-flow graphs 1802 for logic level intrusion detection is commonly known. For example, control flow integrity is a security mechanism that can identify attacks like buffer-overflow that misuse application logic bugs. Though CFGs 1802 are generally sparse graphs, they can grow very big in size. Hence, it is important to design IDS techniques that can work with a reduced representation of CFGs 1802. A Minimum Spanning Tree (MST) 1804 contains all vertices and only some paths of its source graph and the number of MSTs 1804 for sparse graphs is generally less. Hence, a set of MSTs 1804 extracted from a CFG 1802 can be used for IDS that detect program level anomalies.

Traditionally, intrusion detection systems (IDS) check for known malware in programs by performing signature matching on a threat database. Signature match using exact string matching is limited in scope because variants of the same attack will have different signatures. One known method of detecting new malwares using statistical machine learning comprises static analysis using CFG 1802 is another efficient way to detect intrusions. However, this method is very complex. Another known method of detecting new malwares using statistical machine learning comprises converting a CFG 1802 to a string and implementing string matching. However, the solution will not be polynomial. Also, CFG 1802 at basic block level can have basic block variants that look different, but perform the same function. To deal with these shortcomings, many known approximate matching techniques have been proposed. Tracing applications to get their CFG 1802 is another approach that is used in applications, such as, for example, xtrace and pivottrace. In the case of big data systems, data nodes usually have the same processor architecture. Hence it can be assumed that there will be no variants when the CFG 1802 is constructed at byte-level. It is then sufficient to verify similarity among the CFGs 1802 of two processes to confirm coherence in the nodes of a big data system 502.

According to various embodiments of the present disclosure, the attack detection system 500c checks for program level anomalies in big data applications by analyzing and comparing the control-flow behavior of all processes running inside a big data system. First, the control-flow of each process running on a node in the big data cluster is locally analyzed. In this step, a set of minimum spanning trees (MST) 1804 are extracted from the instruction level control-flow graph 1802 of a compiled program 700. The extracted MSTs 1804 are hashed and stored in an array called the program signature. Then, the stored program signature is encrypted and shared with other replica nodes 112 that run the same program. Next, the received encrypted program signature is decrypted and matched with the local version to check for coherence. Matching two program signatures involves finding a perfect match for every MST of one signature in the set of MSTs of the other. The result of the matching step is then shared with replica nodes for consensus.

A control-flow graph 1802 is a directed graph representation of a program and usually a sparse graph. Vertices in a CFG 1802 give the level of detail, such as instruction-level or basic block level that cannot be further divided. Edges in CFG 1802 represent control jumps and are classified into two types —forward and backward. Branch instructions, function calls, conditional and unconditional jumps account for forward edges. Virtual calls and indirect function calls are also considered as forward edges but their destinations are difficult to determine. Loops and returns generally account for backward edges. A CFG 1802 contains all possible control-flow paths of a program. Hence, the integrity among duplicate processes that run on replica nodes of a big data system can be verified with the information available in a CFG 1802. To reduce the complexity of graph algorithms, CFGs 1802 can be reduced to trees or subgraphs before performing any coherence or integrity checks. A CFG 1802 can be converted into a tree using methods, such as, for example, depth first traversal, dominator tree (DT), minimum spanning tree (MST), and minimum spanning arborescence (MSA).

According to various embodiments of the present disclosure, MST and MSA can be used interchangeably. CFGs 1802 can be broken into subgraphs using methods like k sub-graph matching and graph coloring. Some known methods for graph reduction and graph comparison (assume graphs to have n vertices and m edges) include: (1) using the Smith-Waterman algorithm with Levenshtein distance to identify similarity between two graphs represented as strings and the time complexity is O(nm); (2) based on traversal, (a) a preorder traversal of a graph G where each node is processed before its descendants, and (b) a reverse postorder in a DAG gives a topological order of the nodes; (3) building a data structure built using Depth First Search; and (4)

transitive reduction of a sparse graph to another graph with fewer edges but same transitive closure, where the time complexity is O(nm).

Figure 19:
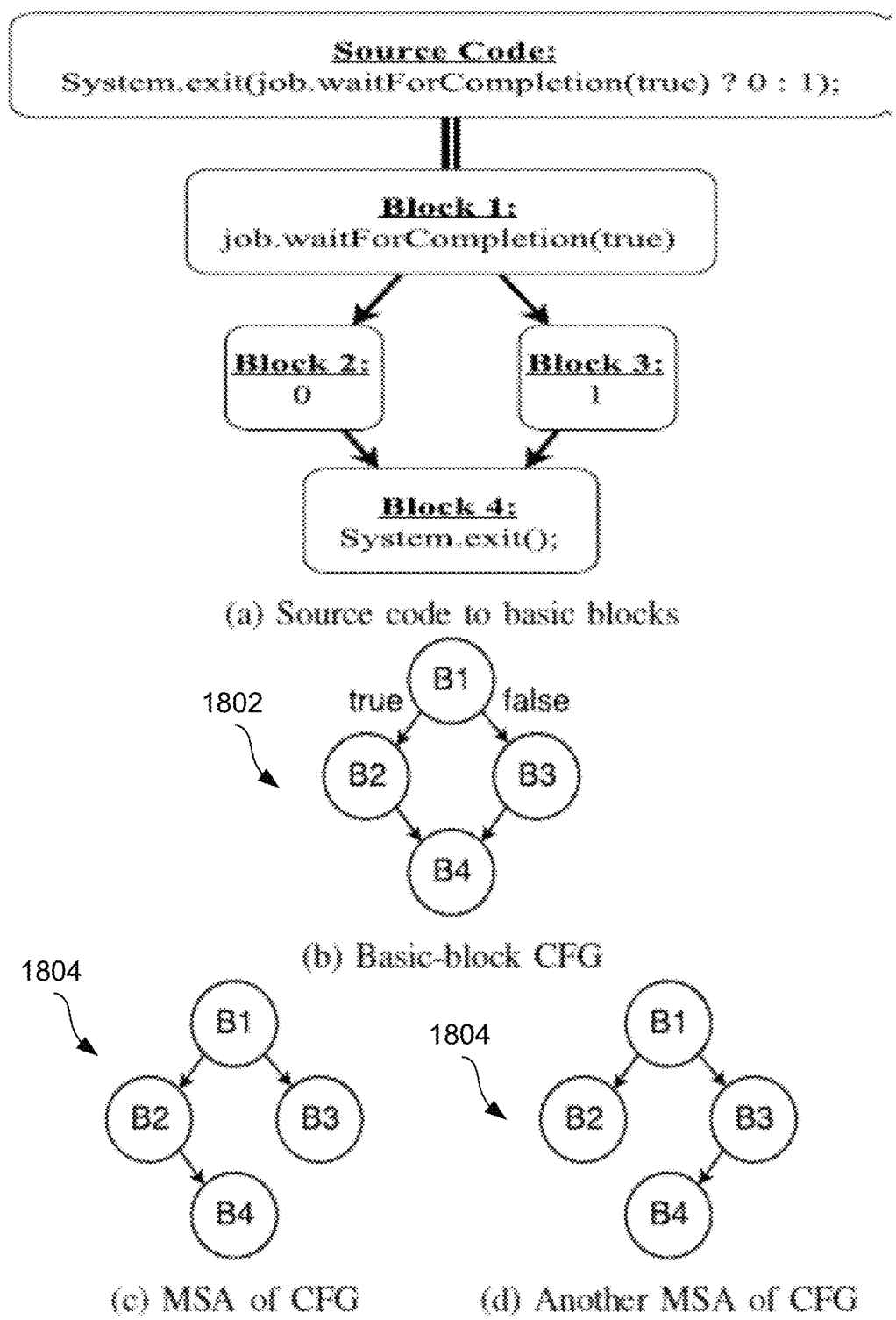
FIG. 19 shows transformation of a line of java code to basic blocks of bytecode to CFG to set of MSAs according to various embodiments of the present disclosure.

According to various embodiments of the present disclosure, a CFG 1802 is reduced to its set of MSTs 1804, which can be used for intrusion detection because CFGs 1802 are generally sparse graphs. In some embodiments, Edmond's algorithm can be used to extract MSTs 1804 from a digraph. Since an MST 1804 contains all vertices of its graph, there will be no loss in the program instruction data. Depending on the connectedness of the graph, the edge count will defer between the CFG 1802 and MST 1804 representation of a program. FIG. 19 shows transformation of a line of java code to basic blocks of bytecode to CFG 1802 to set of MSAs 1804. Vertices B1, B2, B3, B4 are the basic blocks formed from Java bytecode. There exists an O(m+n log n) time algorithm to compute a min-cost arborescence. In other embodiments, a CFG 1802 can be converted to MST 1804 using union find which is used by popular compilers like llvm and gcc. The final output of such conversion is used for security analysis in these compilers. One known disadvantage of converting CFG 1802 to MST 1804 is that dynamic link library calls cannot be verified.

Profiling and Process Analysis

According to various embodiments, each security module 504 of the attack detection system 500c is configured to process level intrusion detection by observing coherence in the behavior of duplicate processes running on replica data nodes of a distributed big data system 502. The disassembled object code (DOC) 700 of a compiled program can be used to generate the control flow graph (CFG) 1802 at instruction level. Since most big data frameworks use a virtual machine (like JVM), an instruction level CFG 1802 in this context is the same as byte-level CFG 1802.

Program level intrusions can be identified by comparing duplicate processes running on replica data nodes 112. CFGs are digraphs that include all possible control paths in a program. This makes CFG a great tool to obtain control-flow behavior of its process. Furthermore, similarity check between program logic of two programs can be performed by comparing their CFGs for isomorphism. There are many ways to check for such graph isomorphism, but analyzing the similarity of two processes by conducting CFG level graph isomorphism is hard and time consuming.

According to various embodiments, a program can be represented by the set of all possible minimum spanning tree/arborescence (MST/MSA) of the program that can be extracted from a byte-level CFG using Edmonds algorithm. This set of MSTs is further confined to using only the set of edge-disjoint MSTs. The extracted set of edge disjoint MSTs are then hashed to generate a set of fixed-length strings which is set as the program signature. There are many versions proposed for Edmonds algorithm, such as, for example, a version from NetworkX graph library that generates edge disjoint spanning trees from the root vertex of a given digraph. Once a minimal representation of the logic in a program is obtained in the form of an MSA, it is converted into a string by listing the node list first followed by edge list, which is in accordance to the DOT format representation. Hash of MSA strings can be created using any regular hashing algorithm like secure hash algorithm (SHA) or MD5. Since a sparse graph like CFG can have multiple MSAs, the program signature can be a set of hash strings. Having all possible MSAs in the program signature makes the graph similarity check more reliable. Program signatures are encrypted before being shared with replica data nodes for tighter security. Every data node in a big data system runs the proposed profiling method for every running process and it includes all the steps involved in converting the compiled binary of a program to its program signature.

Figure 20:
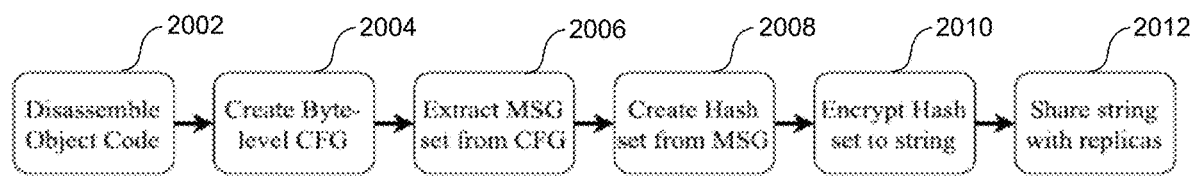
FIG. 20 is a flowchart illustrating one example of the profiling method of a security system module according to various embodiments of the present disclosure.

FIG. 20 is a flowchart illustrating one example of the profiling method of a security system module according to various embodiments of the present disclosure. Specifically, at reference numeral 2002, the disassembled object code 700 of a compiled program is determined. At reference numeral 2004, the disassembled object code (DOC) 700 of the compiled program can be used to generate the control flow graph (CFG) 1802 at instruction level. Next, at 2006, the set of MSGs is extracted from the CFG 1802. At reference numeral 2008, the hash set is created from the MSG 1804. At reference numeral 2010, the hash set is encrypted to a string. At reference numeral 2012, the encrypted string is shared with the replica nodes 112.

Matching of Process Signatures

Figure 21:
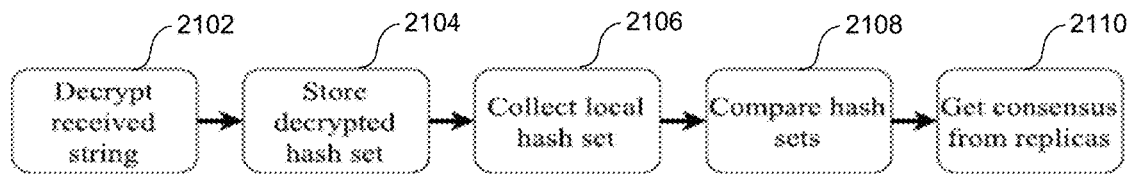
FIG. 21 is a flowchart illustrating one example of the matching method of a security system module according to various embodiments of the present disclosure.

Replication property of big data systems 502 opens scope for new methods of implementing application logic level IDS techniques. Process similarity check among duplicate nodes of the cluster helps in checking for coherence among the replica data nodes 112 while performing a write or read operation. When a process is scheduled to run on a data node 112 that hosts the primary copy of a data, a signature for that process is created by the profiling method and that signature string is shared with all replica data nodes 112. In the matching method, the process signatures received from other data nodes 112 are decrypted and matched with the local versions of the same process. The results are shared with all other replica data nodes for consensus. FIG. 21 is a flowchart illustrating one example of the matching method of a security system module according to various embodiments of the present disclosure. For example, at reference numeral 2102, the received string at the replica data node 112 is decrypted. At reference numeral 2104, the decrypted hash set is stored. At reference numeral 2106, the local hash set is collected. At reference numeral 2108, the local hash set is compared with the decrypted received hast set. At reference 2110, a consensus on whether there is a detected instruction is received among the replica data nodes 112 based on the comparison of the hash sets.

The data nodes 112 communicate with each other via the secure protocol. The most important part of the matching method is to check for similarity (or dissimilarity) between two program signatures. According to various embodiments, graph similarity check can be performed by checking node similarity and edge similarity. The following points are considered while comparing MSTs to check for similarity among programs: (1) MSTs are sparse graphs obtained from byte-level CFGs, and thus, checking for path sensitivity is not exponential; (2) all edges are assumed to have the same weight of 1, and the total number of MSTs for a CFG is limited; (3) by Edmonds theorem, a graph which is k-connected always has k edge-disjoint arborescence; (4) two MSTs are a perfect match if their node sets and edge sets match exactly; (5) if edge set of one MST is a subset of the edge set of another MST, the source graphs of these MSTs are not similar; (6) two graphs are similar if for every MST in one graph there exists a perfect match in the set of MSTs of the other graph; (7) hashing algorithms like SHA1 or MD5 are quick and efficient.

Based on the points listed above, the following method is developed for graph similarity check. Let us consider 2 control-flow graphs G1 and G2. Let <N1,E1> represent G1 where N1 is the node set of the graph G1 and E1 is the edge set of the graph. Similarly, <N2,E2> represents G2 where N2 is the node set of the graph G1 and E2 is the edge set of the graph. After employing a variation of Edmonds algorithm on these CFGs (such as finding all edge-disjoint MSTs), lets us assume that M1 [<N1,E1'>] is the set of MST/MSA for G1 and M2 [<N2,E2'>] is the set of MST/MSA for G2. In order to check for similarity in both graphs G1 and G2, the security system module of the particular node determines whether there is a perfect match in M2 for all MSTs in M1. In some embodiments, the match function can be simplified by using a hash function on M1 and M2 to create a unique hash for every MST. For example, assume H1 is a set of hashes generated from M1 and H2 is the set of hashes from M2. If any hash in H1 does not exist in H2, the security system module can determine that the graphs are not equal.

Experimental Results

An Amazon EC2 m4.xlarge instance running Ubuntu 14.04 was used to generate MSTs (and their hashes) from CFGs using SageMath. The intrusion detection technique employed by the attack detection system 500c of the present disclosure was tested on an Amazon EC2 big data duster of 5 t2.micro nodes —one master node, one secondary master node and three data nodes with a replication factor of three. The software used to conduct the experiment included (1) SageMath, a free open-source mathematics software system for mathematical calculations; (2) GraphML, a popular graph representation format which can used to represent both CFG and MST; (3) Graphviz, open source graph visualization software that takes input in DOT format and makes diagrams in useful formats; (4) NetworkX, a Python language software package that provides graph algorithms like Edmonds and VF2; and (5) Control-flow graph factory, a software that generates CFGs from java bytecode (class file) and exports them to GraphML or DOT formats.

The intrusion detection technique employed by the attack detection system 500c was tested using sixteen (16) Hadoop® MapReduce examples that can be found in all Hadoop® distributions. The class files of these examples are readily available in the Hadoop® distributions. First, control-flow graph factory was used to generate control flow graphs from the class files. These graphs are stored in graphml format and given as input to a simple SageMath script that uses NetworkX library and computes the edge-disjoint MSAs and hashes them using MD5. A C++ application was used to implement encryption and secure communication needed for the proposed IDS technique. The hashes were fixed length strings and so a basic numeric key based left/right shift was used for encryption/decryption of messages.

Figure 22A:
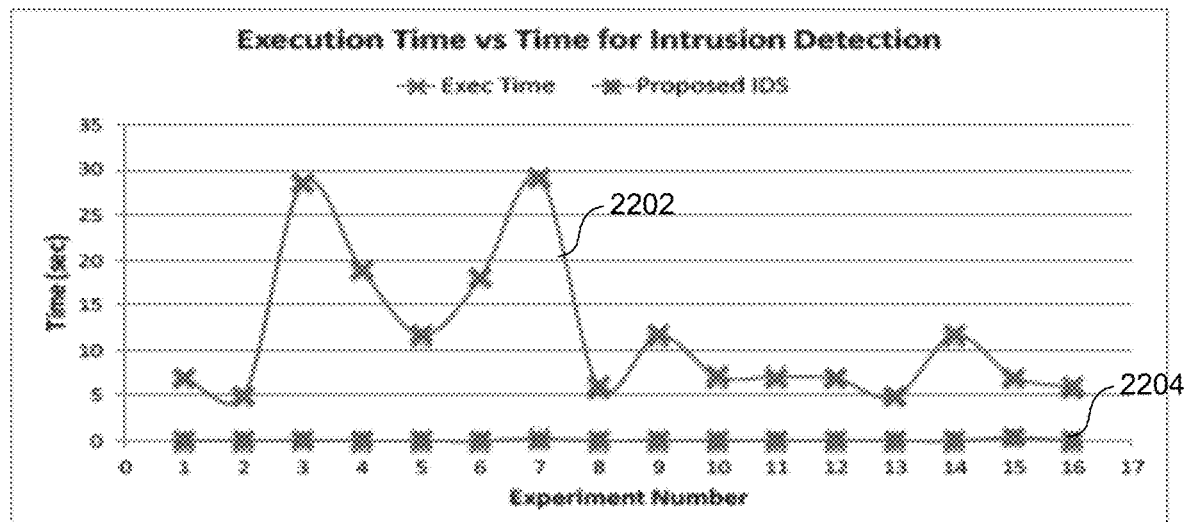
FIGS. 22A and 22B are graphical representations showing the results of the experiments of the attack detection system according to various embodiments of the present disclosure.
Figure 22B:
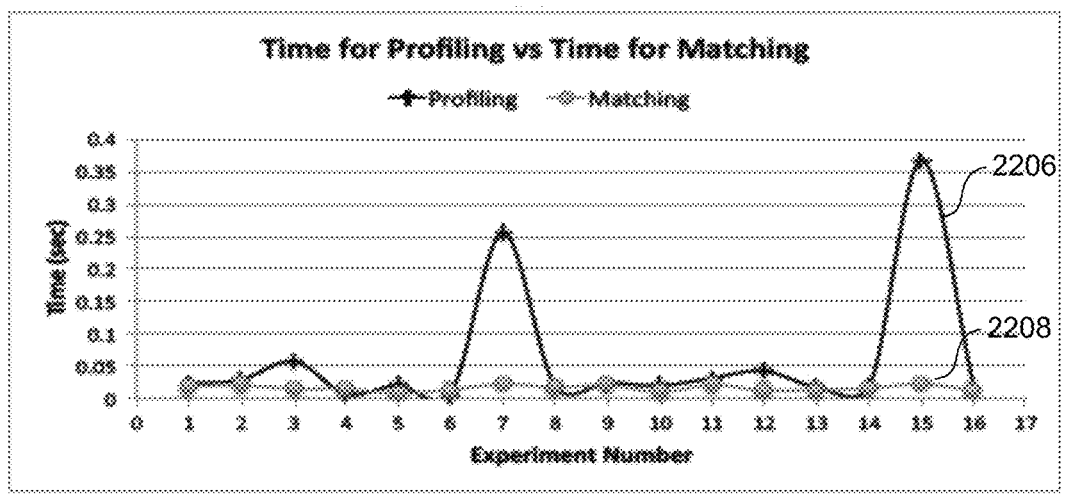

FIGS. 22A and 22B are graphical representations showing the results of the experiments. FIG. 22A shows the comparison between the execution time 2202 taken to run the Hadoop® MapReduce examples on a big data cluster and the intrusion detection time 2204 taken to run the intrusion detection technique according to various embodiments. The execution times 2202 for some examples are inconsistent among multiple runs. Table II illustrates that only 0.81% of time taken to execute an example is needed to analyze the example for intrusion detection. The time 2204 needed to run the instruction detection technique includes (a) time taken to create CFG for the main method from the class file; (b) time taken to extract MST set from CFG; (c) time taken to hash the MSTs and encrypt them and; (d) time taken to check for similarity among duplicate processes by comparing the program signatures. FIG. 22B illustrates a graphical representation of an example of a time comparison of the profiling methods 2206 and matching methods 2208 of the intrusion detection method. FIG. 22B shows the time required by the intrusion detection technique is influenced by the profiling method 2206 trying to extract MSAs from CFG, particularly when there are more than one MSAs for a CFG. Though the matching method 2208 performance is directly proportional to the square of the size of the number of edge-disjoint MSAs in a CFG (i.e., $O(N^2)$ worst case complexity), it is rare to have more than a couple of edge-disjoint MSAs in a CFG because of the sparse nature of CFG.

In addition to the foregoing, the various embodiments of the present disclosure include, but are not limited to, the embodiments set forth in the following clauses.

Clause 1. An attack detection system for a big data system, the attack detection system comprising: a plurality of security modules comprising a processor and a memory, individual security modules of the plurality of security modules being coupled to a respective data node of the big data system; and at least one application being executable by the individual security modules, wherein when executed, the at least one application causes the individual security modules to at least: identify a process executing on the respective data node; generate a process signature for the process executing on the data node; and determine whether the big data system is being attacked based at least in part on a comparison of the process signature with at least one other process signature for the same process executing on at least one other security module of the plurality of security modules, the at least one other process signature being received via secure communication from the at least one other security module.

Clause 2. The attack detection system of clause 1, wherein, when executed, the at least one application further causes the individual security modules to at least convert the process to assembly code.

Clause 3. The attack detection system of clause 1, wherein the process signature comprises an attack probability score assigned to the process, and wherein generating the process signature further comprises: identifying one or more control flow instructions associated with the process; and determining the attack probability score based at least in part on the one or more control flow instructions and a plurality of predefined rules.

Clause 4. The attack detection system of clause 1, wherein the process signature comprises a process hash comprising a plurality of control flow hashes associated with a plurality of control flow instruction sequences, and generating the process signature further comprises: generating the plurality of control flow instruction sequences based at least in part on an analysis of assembly code of the process, individual control flow instruction sequences including a respective type of control flow instruction; for the individual control flow instruction sequences, generate a respective control flow hash of the plurality of control flow hashes; and generate the process hash based at least in part on the plurality of control flow hashes.

Clause 5. The attack detection system of clause 1, wherein the process signature comprises a hash associated the control flow of the process, and generating the process signature comprises: creating a control flow graph of the process; extracting one or more minimum spanning trees from the control flow graph; and creating the hash according to the one or more minimum spanning trees.

Clause 6. The attack detection system of clause 1, wherein the at least one other process signature is encrypted by the at least one other security module by private/public key encryption, and a public key being received from the at least one other security module.

Clause 7. The attack detection system of clause 1, wherein, when executed, the at least one application further causing the individual security modules to at least decrypt the at least one other process signature via a private key associated with a respective security module and the public key received from the at least one other security module.

Clause 8. The attack detection system of clause 1, wherein the attack detection system is independent of the big data system and is hosted separately by the plurality of security modules comprising secure hardware.

Clause 9. A system, comprising: a distributed data system comprising a plurality of data nodes; an attack detection system comprising a plurality of security modules, individual security modules being integrated within a respective data node of the plurality of data nodes, the individual security modules comprising a processor and a memory, and the individual security modules being configured to securely communicate with one another via an independent security protocol; and at least one application executable on the individual security modules, wherein, when executed, the at least one application causes the individual security modules to at least: identify a process executing on the respective data node; generate a process signature for the process based at least in part on a control flow structure associated with the process; and determine that the distributed data system is being attacked based at least in part on a comparison of the process signature with at least one other processor signature for the same process executing on at least one other security module of the plurality of security modules, the at least one other process signature being received via a secure communication with the at least one other security modules.

Clause 10. The system of clause 9, wherein the independent security protocol comprises encrypting and decrypting a respective process signature using a private key and a shared public key.

Clause 11. The system of clause 9, wherein the process signature comprises an attack probability score assigned to the process, and wherein generating the process signature further comprises: identifying one or more control flow instructions associated with the process; and determining the attack probability score based at least in part on the one or more control flow instructions and a plurality of predefined rules.

Clause 12. The system of clause 9, wherein the process signature comprises a process hash comprising a plurality of control flow hashes associated with a plurality of control flow instruction sequences, and generating the process signature further comprises: generating the plurality of control flow instruction sequences based at least in part on an analysis of assembly code of the process, individual control flow instruction sequences including a respective type of control flow instruction; for the individual control flow instruction sequences, generate a respective control flow hash of the plurality of control flow hashes; and generate the process hash based at least in part on the plurality of control flow hashes.

Clause 13. The system of clause 9, wherein the process signature comprises a hash associated the control flow of the process, and generating the process signature comprises: creating a control flow graph of the process; extracting one or more minimum spanning trees from the control flow graph; and creating the hash according to the one or more minimum spanning trees.

Clause 14. The system of clause 9, wherein, when executed, the at least one application further causes the at least one computing device to at least notify a master node of the attack.

Clause 15. A method, comprising: identifying, via a security module integrated within a data node of a distributed data system, a process executing on the data node; generating, via the security module, a process signature of the process based at least in part on a control flow structure of the process; receiving, via the security module, another process signature of the process from another security module integrated within another data node of the distributed data system, the same process being executed on the other data node, and the other process signature being received via a secure communication between the security module and the other security module; and detecting, via the security module, an attack on the distributed data system, based at least in part on a comparison of the process signature with the other process signature.

Clause 16. The method of clause 15, further comprising notifying, via the security module, a master node of the attack.

Clause 17. The method of clause 15, further comprising decrypting, via the security module, the other process signature using a private key associated with the security module and a public key received from the other security module.

Clause 18. The method of clause 15, further comprising: encrypting, via the security module, the process signature using a public key and a private key; and sending, via the security module the process signature and the public key to the other security module.

Clause 19. The method of clause 15, wherein generating the process signature further comprises: identifying, via the security module, one or more control flow instructions associated with the process; and determining, via the security module, an attack probability score based at least in part on the one or more control flow instructions and a plurality of predefined rules, the process signature comprising the attack probability score.

Clause 20. The method of clause 15, wherein the process signature comprises a process hash comprising a plurality of control flow hashes associated with a plurality of control flow instruction sequences, and generating the process signature further comprises: generating the plurality of control flow instruction sequences based at least in part on an analysis of assembly code of the process, individual control flow instruction sequences including a respective type of control flow instruction; for the individual control flow instruction sequences, generate a respective control flow hash of the plurality of control flow hashes; and generate the process hash based at least in part on the plurality of control flow hashes.

Clause 21. The method of clause 15, wherein the process signature comprises a hash associated the control flow of the process, and generating the process signature comprises: creating a control flow graph of the process; extracting one or more minimum spanning trees from the control flow graph; and creating the hash according to the one or more minimum spanning trees.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

It should be noted that ratios, concentrations, amounts, and other numerical data may be expressed herein in a range format. It is to be understood that such a range format is used for convenience and brevity, and thus, should be interpreted in a flexible manner to include not only the numerical values explicitly recited as the limits of the range, but also to include all the individual numerical values or sub-ranges encompassed within that range as if each numerical value and sub-range is explicitly recited. To illustrate, a concentration range of "about 0.1% to about 5%" should be interpreted to include not only the explicitly recited concentration of about 0.1 wt % to about 5 wt %, but also include individual concentrations (e.g., 1%, 2%, 3%, and 4%) and the sub-ranges (e.g., 0.5%, 1.1%, 2.2%, 3.3%, and 4.4%) within the indicated range. The term "about" can include traditional rounding according to significant figures of numerical values. In addition, the phrase "about 'x' to 'y'" includes "about 'x' to about 'y'".

The invention claimed is:

1. An attack detection system for a big data system, the attack detection system comprising:
   a plurality of security modules each comprising a respective first processor and a respective memory, the plurality of security modules being in data communication with one another via a secure communication channel, individual security modules of the plurality of security modules being coupled to a respective data node of a plurality of data nodes, individual data nodes being configured to execute big data processes the big data system, and the plurality of security modules being configured to detect an attack on the big data system based at least in part on an analysis of one or more of the big data processes executing on at least one respective second processor of the plurality of data nodes in the big data system; and
   at least one application being executable by the individual security modules, wherein when executed, the at least one application causes the individual security modules to at least:
      identify a first big data process executing on a respective second processor of the respective data node, the first big data process being a replica of a second big data process executing on at least one other second processor of the plurality of data nodes;
      generate a process signature for the first big data process executing on the data node by:
         creating a control flow graph of the first big data process; and
         creating a hash according to one or more minimum spanning trees extracted from the control flow graph, the process signature comprising the hash;
      receive at least one other process signature corresponding to the second big data process from at least one respective security module of the plurality of security modules associated with the at least one other second processor, the at least one other process signature being received via the secure communication channel; and
      determine whether the big data system is being attacked based at least in part on a comparison of the process signature with the at least one other process signature for the second big data process.

2. The attack detection system of claim 1, wherein, when executed, the at least one application further causes the individual security modules to at least convert the first big data process to assembly code for analysis.

3. The attack detection system of claim 1, wherein the process signature comprises an attack probability score assigned to the process, and wherein generating the process signature further comprises:
   identifying one or more control flow instructions associated with the first big data process; and
   determining the attack probability score based at least in part on the one or more control flow instructions and a plurality of predefined rules.

4. The attack detection system of claim 1, wherein the process signature comprises a process hash comprising a plurality of control flow hashes associated with a plurality of control flow instruction sequences, and generating the process signature further comprises:
   generating the plurality of control flow instruction sequences based at least in part on an analysis of assembly code of the first big data process, individual control flow instruction sequences including a respective type of control flow instruction;
   for the individual control flow instruction sequences, generate a respective control flow hash of the plurality of control flow hashes; and
   generate the process hash based at least in part on the plurality of control flow hashes.

5. The attack detection system of claim 1, wherein the at least one other process signature is encrypted by the at least one other security module by private/public key encryption, and a public key being received from the at least one other security module.

6. The attack detection system of claim 1, wherein, when executed, the at least one application further causes the individual security modules to at least decrypt the at least one other process signature via a private key associated with a respective security module and a public key received from the at least one other security module.

7. The attack detection system of claim 1, wherein the attack detection system is independent of the big data system and is hosted separately by the plurality of security modules comprising secure hardware.

8. A system, comprising:
   a distributed data system comprising a plurality of data nodes;
   an attack detection system comprising a plurality of security modules, individual security modules being integrated within a respective data node of the plurality of data nodes, individual data nodes being configure to execute big data processes in the distributed data system, the individual security modules each comprising a respective first processor and a respective memory, and the individual security modules being configured to:
      securely communicate with one another via an independent security protocol; and
      detect an attack on the distributed data system based at least in part on an analysis of one or more processes executing on at least one respective second processor of the plurality of data nodes in the distributed data system;
   at least one application executable on the individual security modules, wherein, when executed, the at least one application causes the individual security modules to at least:
      identify a first process executing on a respective second processor of the respective data node, the first process being a replica of a second process executing on at least one other second processor of the plurality of data nodes;

generate a process signature for the first process based at least in part on a control flow structure associated with the first process, wherein generating the process signature comprises:
creating a control flow graph of the first process; and
creating a hash according to one or more minimum spanning trees extracted from the control flow graph, the process signature comprising the hash;

receive at least one other process signature corresponding to the second process from at least one respective security module of the plurality of security modules associated with the at least one other second processor, the at least one other process signature being received via the secure communication channel; and determine that the distributed data system is being attacked based at least in part on a comparison of the process signature with the at least one other process signature for the second process.

9. The system of claim 8, wherein the independent security protocol comprises encrypting and decrypting a respective process signature using a private key and a shared public key.

10. The system of claim 8, wherein the process signature comprises an attack probability score assigned to the process, and wherein generating the process signature further comprises:
identifying one or more control flow instructions associated with the first process; and
determining the attack probability score based at least in part on the one or more control flow instructions and a plurality of predefined rules.

11. The system of claim 8, wherein the process signature comprises a process hash comprising a plurality of control flow hashes associated with a plurality of control flow instruction sequences, and generating the process signature further comprises:
generating the plurality of control flow instruction sequences based at least in part on an analysis of assembly code of the first process, individual control flow instruction sequences including a respective type of control flow instruction;
for the individual control flow instruction sequences, generate a respective control flow hash of the plurality of control flow hashes; and
generate the process hash based at least in part on the plurality of control flow hashes.

12. A method, comprising:
identifying, via a security module integrated within a data node of a distributed data system, the security module being one security module of a plurality of security modules that are integrated within a plurality of data nodes in a distributed data system, the plurality of security modules comprising a respective first processor and the plurality of data nodes comprising a respective second processor, the first process being executed on the respective second processor of the data node, and the plurality of security modules being configured to detect an attack in the distributed data system based at least in part on an analysis of one or more big data processes executing on at least one respective second processor of the plurality of data nodes;

generating, via the security module, a process signature of the first process based at least in part on a control flow structure of the first process, wherein generating the process signature comprises:
creating a control flow graph of the first process; and
creating a hash according to one or more minimum spanning trees extracted from the control flow graph, the process signature comprising the hash;

receiving, via the security module, another process signature of a second process generated by another security module integrated within another data node of the distributed data system, the second process being a replica of the first process, the second process being executed on the respective second processor of the other data node, and the other process signature being received via a secure communication between the security module and the other security module; and detecting, via the security module, an attack on the distributed data system, based at least in part on a comparison of the process signature with the other process signature.

13. The method of claim 12, further comprising decrypting, via the security module, the other process signature using a private key associated with the security module and a public key received from the other security module.

14. The method of claim 12, further comprising:
encrypting, via the security module, the process signature using a public key and a private key; and
sending, via the security module the process signature and the public key to the other security module.

15. The method of claim 12, wherein generating the process signature further comprises:
identifying, via the security module, one or more control flow instructions associated with the process; and
determining, via the security module, an attack probability score based at least in part on the one or more control flow instructions and a plurality of predefined rules, the process signature comprising the attack probability score.

16. The method of claim 12, wherein the process signature comprises a process hash comprising a plurality of control flow hashes associated with a plurality of control flow instruction sequences, and generating the process signature further comprises:
generating the plurality of control flow instruction sequences based at least in part on an analysis of assembly code of the process, individual control flow instruction sequences including a respective type of control flow instruction;
for the individual control flow instruction sequences, generate a respective control flow hash of the plurality of control flow hashes; and
generate the process hash based at least in part on the plurality of control flow hashes.

17. The attack detection system of claim 1, wherein the big data processes are not executed by the plurality of security modules.

* * * * *